US012120058B2

(12) United States Patent
Wang et al.

(10) Patent No.: US 12,120,058 B2
(45) Date of Patent: Oct. 15, 2024

(54) ELECTRONIC DEVICE, USER EQUIPMENT, WIRELESS COMMUNICATION METHOD AND STORAGE MEDIUM

(71) Applicant: Sony Group Corporation, Tokyo (JP)

(72) Inventors: Huajun Wang, Shanghai (CN); Min Liu, Beijing (CN)

(73) Assignee: SONY GROUP CORPORATION, Tokyo (JP)

( * ) Notice: Subject to any disclaimer, the term of this patent is extended or adjusted under 35 U.S.C. 154(b) by 393 days.

(21) Appl. No.: 17/764,198

(22) PCT Filed: Nov. 2, 2020

(86) PCT No.: PCT/CN2020/125786
§ 371 (c)(1),
(2) Date: Mar. 28, 2022

(87) PCT Pub. No.: WO2021/088757
PCT Pub. Date: May 14, 2021

(65) Prior Publication Data
US 2022/0337370 A1    Oct. 20, 2022

(30) Foreign Application Priority Data

Nov. 7, 2019  (CN) .......................... 201911081327.5

(51) Int. Cl.
*H04L 5/00* (2006.01)
*H04W 74/0833* (2024.01)
(52) U.S. Cl.
CPC .......... *H04L 5/0051* (2013.01); *H04L 5/0092* (2013.01); *H04W 74/0833* (2013.01)
(58) Field of Classification Search
CPC . H04L 5/0051; H04L 5/0092; H04W 74/0833
See application file for complete search history.

(56) References Cited

U.S. PATENT DOCUMENTS 10,873,916 B2 * 12/2020 Park ................. H04W 72/0446
11,595,907 B2 *  2/2023 Hosseini ............... H04W 72/21
(Continued)

FOREIGN PATENT DOCUMENTS

CN         103427895 A      12/2013
CN         107197517 A       9/2017
(Continued)

OTHER PUBLICATIONS

International Search Report and Written Opinion mailed on Jan. 26, 2021, received for PCT Application PCT/CN2020/125786, Filed on Nov. 2, 2020, 8 pages including English Translation.

*Primary Examiner* — Ajay Cattungal
(74) *Attorney, Agent, or Firm* — XSENSUS LLP

(57) ABSTRACT

An electronic device of a network side includes a processing circuit, which is configured to divide a service range of the electronic device into a plurality of timing advance group (TAG) areas according to position information, and to allocate one or more user equipments in each TAG area to the same TAG; and same is also configured to send timing advance (TA) information to the user equipments, wherein the TA information comprises TA values corresponding to the TAGs allocated for the user equipments, such that the user equipments use the TA values corresponding to the TAGs allocated for the user equipments as TA values between the user equipments and the electronic device. By means of the electronic device, a signaling overhead brought about by a TA update can be reduced, and the probability of random access preamble collisions can be reduced, thereby improving the probability of random access success.

20 Claims, 14 Drawing Sheets

(56) References Cited

U.S. PATENT DOCUMENTS

| | | | |
|---|---|---|---|
| 2013/0100938 A1 | 4/2013 | Kwon et al. | |
| 2013/0279435 A1* | 10/2013 | Dinan | H04W 52/40 370/329 |
| 2014/0105141 A1* | 4/2014 | Noh | H04L 5/001 370/329 |
| 2015/0245403 A1* | 8/2015 | Futaki | H04B 7/024 370/329 |
| 2015/0327198 A1* | 11/2015 | Axmon | H04W 56/0045 370/336 |
| 2016/0270071 A1* | 9/2016 | Dinan | H04L 1/1854 |
| 2016/0295575 A1* | 10/2016 | Dinan | H04W 52/146 |
| 2016/0309438 A1* | 10/2016 | Xu | H04W 56/0045 |
| 2016/0330676 A1* | 11/2016 | Thangarasa | H04W 48/20 |
| 2017/0055223 A1* | 2/2017 | Shao | H04W 52/146 |
| 2017/0164410 A1* | 6/2017 | Takeda | H04W 28/16 |
| 2017/0303212 A1* | 10/2017 | Takeda | H04W 16/32 |
| 2017/0339660 A1* | 11/2017 | Kazmi | H04W 64/003 |
| 2018/0124829 A1* | 5/2018 | Lee | H04W 72/12 |
| 2018/0317187 A1* | 11/2018 | Kwon | H04W 56/00 |
| 2019/0052339 A1* | 2/2019 | Zhou | H04W 76/19 |
| 2019/0082408 A1* | 3/2019 | Kim | H04W 72/0453 |
| 2019/0253992 A1* | 8/2019 | Kwon | H04W 56/0015 |
| 2020/0007292 A1* | 1/2020 | Huang | H04W 72/542 |
| 2020/0015316 A1* | 1/2020 | Islam | H04W 56/0045 |
| 2020/0196262 A1* | 6/2020 | Kwon | H04W 56/0045 |
| 2020/0229103 A1* | 7/2020 | Hosseini | H04W 52/34 |
| 2021/0105732 A1* | 4/2021 | Takeda | H04L 5/0092 |
| 2021/0352613 A1* | 11/2021 | Yoon | H04L 5/0092 |
| 2022/0124707 A1* | 4/2022 | Bae | H04W 72/446 |
| 2022/0159596 A1* | 5/2022 | Kim | H04J 11/00 |

FOREIGN PATENT DOCUMENTS

| | | |
|---|---|---|
| CN | 108156595 A | 6/2018 |
| WO | WO-2020034574 A1 | 2/2020 |

\* cited by examiner

| TAG | TA value |
|---|---|
| TAG1(UE1, UE2, UE3) | TA value 1 |
| TAG2(UE4) | TA value 2 |
| TAG3(UE5) | TA value 3 |
| TAG4(UE6) | TA value 4 |

Figure 3

| TAG ID | TA value |
|---|---|
| 1 | TA value 1 |
| 2 | TA value 2 |
| 3 | TA value 3 |
| 4 | TA value 4 |

Figure 4

| TAG ID | TA value |
|---|---|
| 1 | TA value 1 |

Figure 5

| TAG ID | TA value |
|---|---|
| 1 | TA value 1 |
| 3 | TA value 3 |

| TAG | TA value |
|---|---|
| TAG1(UE1, UE2, UE3) | TA value 1 |
| TAG2(UE4, UE5) | TA value 2 |
| TAG4(UE6) | TA value 4 |

ELECTRONIC DEVICE, USER EQUIPMENT, WIRELESS COMMUNICATION METHOD AND STORAGE MEDIUM

CROSS-REFERENCE TO RELATED APPLICATIONS

This application is based on PCT/CN2020/125786 filed on Nov. 2, 2020, which claims the priority to Chinese Patent Application No. 201911081327.5, titled "ELECTRONIC DEVICE, USER EQUIPMENT, WIRELESS COMMUNICATION METHOD AND STORAGE MEDIUM", filed on Nov. 7, 2019 with the Chinese Patent Office, each of which is incorporated herein by reference in its entirety.

TECHNICAL FIELD

The present disclosure generally relates to the field of wireless communications, and in particular to an electronic device, a user equipment, a wireless communication method, and a computer readable storage medium. More specifically, the present disclosure relates to an electronic device as a network side device in a wireless communication system, a user equipment in a wireless communication system, a wireless communication method performed by a network side device in a wireless communication system, a wireless communication method performed by a user equipment in a wireless communication system and a computer readable storage medium.

BACKGROUND

A random access process is a process from a user equipment transmitting a random access preamble for trying to access a network side device to the user equipment establishing a connection with the network side device. The random access process includes a process in which the user equipment transmits a random access preamble to the network side device and a process in which the user equipment obtains a TA (Timing Advance).

In order for uplink information transmitted by the user equipment to reach the network side device at a desired time distant to ensure the orthogonality of uplink transmission and reduce intra-cell interference, it is required for the user equipment to transmit the uplink information some time in advance. TA represents a timing advance for the user equipment to transmit the uplink information in advance. For the accuracy of TA, it is required to update the value of the TA of the user equipment at regular intervals. In addition, the value of the TA is usually related to the distance between the user equipment and the network side device. A greater distance indicates that the value of the TA is greater. In a non-terrestrial network (NTN), the network side device may be located on a satellite device, thus the TA may be frequently updated due to movement of a non-GEO (Geosynchronous Orbit) satellite device relative to the ground, resulting in large signaling overhead.

In addition, in the random access process, the user equipment transmits a random access preamble to the network side device to inform the network side device of a random access request, so that the network side device may estimate the value of the TA based on the random access preamble. In a NTN, since the satellite device covers a wide area, random access preambles from user equipment in different locations may arrive at the satellite at the same time. In a case that the user equipment in different locations transmits random access preambles by using the same resource, intense collisions occur, resulting in random access failures.

For the above problems, it is required to provide a technical solution to reduce the signaling overhead caused by the update of TA, reduce the probability of random access preamble collision, and increase the probability of successful random access.

SUMMARY

A brief summary of the present disclosure is given hereinafter, rather than a comprehensive disclosure of the full scope of the present disclosure or all features of the present disclosure.

According to the present disclosure, an electronic device, a user equipment, a wireless communication method, and a computer readable storage medium are provided to reduce the signaling overhead caused by the update of TA, reduce the probability of random access preamble collision, and increase the probability of successful random access.

According to an aspect of the present disclosure, an electronic device on a network side is provided. The electronic device includes processing circuitry. The processing circuitry is configured to: divide a service region of the electronic device into multiple TAG (Timing Advance Group) regions based on location information, allocate one or more user equipments in each of the TAG regions to a same TAG, and transmit timing advance TA information to the user equipment. The TA information includes a TA value corresponding to a TAG allocated for the user equipment, and the user equipment uses the TA value corresponding to the TAG allocated for the user equipment as a TA value between the user equipment and the electronic device.

According to an aspect of the present disclosure, a user equipment is provided. The user equipment includes processing circuitry. The processing circuitry is configured to: receive timing advance TA information from a network side device; determine, based on the TA information, a TA value corresponding to a timing advance group TAG allocated for the user equipment; and use the TA value corresponding to the TAG allocated for the user equipment as a TA value between the user equipment and the network side device. A service region of the network side device is divided into multiple TAG regions based on location information, and one or more user equipments in each of the TAG regions is allocated to a same TAG.

According to another aspect of the present disclosure, a wireless communication method performed by an electronic device on a network side is provided. The method includes: dividing a service region of the electronic device into multiple timing advance group TAG regions based on location information, allocating one or more user equipments in each of the TAG regions to a same TAG, and transmitting timing advance TA information to the user equipment. The TA information includes a TA value corresponding to a TAG allocated for the user equipment, and the user equipment uses the TA value corresponding to the TAG allocated for the user equipment as a TA value between the user equipment and the electronic device.

According to another aspect of the present disclosure, a wireless communication method performed by a user equipment is provided. The method includes: receiving timing advance TA information from a network side device; determining, based on the TA information, a TA value corresponding to a timing advance group TAG allocated for the user equipment; and using the TA value corresponding to the TAG allocated for the user equipment as a TA value between the user equipment and the network side device. A service region of the network side device is divided into multiple TAG regions based on location information, and one or more user equipments in each of the TAG regions is allocated to a same TAG.

According to another aspect of the present disclosure, an electronic device on a network side is provided. The electronic device includes processing circuitry. The processing circuitry is configured to: divide the service region of the electronic device into multiple resource regions based on location information; configure, for each of the resource regions, resources for transmitting preambles, where user equipments in a same resource region transmit preambles using same resources, and user equipments in different resource regions transmit preambles using orthogonal resources; and transmit service region information of the electronic device to the user equipment. The user equipment determines a resource region to which the user equipment belongs based on location information of the user equipment and the service region information of the electronic device, and determines resources for transmitting a preamble based on the resource region to which the user equipment belongs to transmit the preamble.

According to an aspect of the present disclosure, a user equipment is provided. The user equipment includes processing circuitry. The processing circuitry is configured to: receive service region information of the network side device from the network side device; determine a resource region to which the user equipment belongs based on location information of the user equipment and the service region information of the network side device; and determine resources for transmitting a preamble based on the resource region to which the user equipment belongs to transmit the preamble. The service region of the network side device is divided into multiple resource regions based on location information, one or more user equipments in a same resource region are configured with same resources for transmitting preambles, and user equipments in different resource regions are configured with orthogonal resources for transmitting preambles.

According to another aspect of the present disclosure, a wireless communication method performed by an electronic device on a network side is provided. The method includes: dividing the service region of the electronic device into multiple resource regions based on location information; configuring, for each of the resource regions, resources for transmitting preambles, where user equipments in a same resource region transmit preambles using same resources, and user equipments in different resource regions transmit preambles using orthogonal resources; and transmitting service region information of the electronic device to the user equipment, where the user equipment determines a resource region to which the user equipment belongs based on location information of the user equipment and the service region information of the electronic device, and determines resources for transmitting a preamble based on the resource region to which the user equipment belongs to transmit the preamble.

According to another aspect of the present disclosure, a wireless communication method performed by a user equipment is provided. The method includes: receiving service region information of the network side device from the network side device; determining a resource region to which the user equipment belongs based on location information of the user equipment and the service region information of the network side device; and determining resources for transmitting a preamble based on the resource region to which the user equipment belongs to transmit the preamble. The service region of the network side device is divided into multiple resource regions based on location information, one or more user equipments in a same resource region are configured with same resources for transmitting preambles, and user equipments in different resource regions are configured with orthogonal resources for transmitting preambles.

According to another aspect of the present disclosure, a computer readable storage medium is provided. The computer readable storage medium includes executable computer instructions that, when executed by a computer, cause the computer to execute the wireless communication methods according to the present disclosure.

With the electronic device, user equipment, wireless communication method, and computer readable storage medium according to the present disclosure, the service region of the electronic device serving as the network side device is divided into multiple TAG regions, each of the TAG corresponds to a TA value, and the user equipment may use the TA value corresponding to the TAG allocated for the user equipment as the TA value between the user equipment and the electronic device. Thus, the TA value is configured and updated for each of the TAGs, so that the user equipments in the same TAG uses the same TA value, avoiding configuring and updating the TA value for each of user equipments, thereby reducing signaling overhead caused by updating TA values.

Furthermore, with the electronic device, user equipment, wireless communication method, and computer readable storage medium according to the present disclosure, the service region of the electronic device serving as the network side device is divided into multiple resource regions, and each of the resource regions is configured with resources for transmitting preambles. Thus, user equipments in a same resource region transmit preambles using same resources, and user equipments in different resource regions transmit preambles using orthogonal resources, reducing the probability of collision of preambles, thereby increasing the probability of success with one access operation.

Further areas of applicability will become apparent from the description provided herein. Descriptions and examples in this summary are only schematic and are not intended to limit the scope of the present disclosure.

BRIEF DESCRIPTION OF THE DRAWINGS

The drawings described herein only illustrate the selected embodiments, rather than all embodiments. The drawings are not intended to limit the scope of the present disclosure. In the drawings:

FIG. 3 is a schematic diagram showing a mapping relationship between TAGs and TA values according to an embodiment of the present disclosure;

FIG. 4 is a schematic diagram showing TA information received by UE1 in FIG. 2 according to an embodiment of the present disclosure;

FIG. 5 is a schematic diagram showing TA information received by UE1 in FIG. 2 according to another embodiment of the present disclosure;

Figure 1:
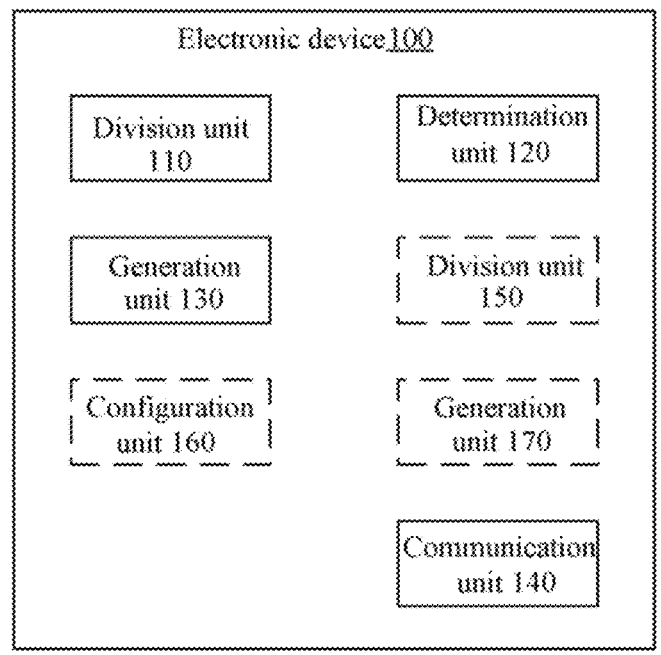
FIG. 1 is a block diagram showing a configuration example of an electronic device according to an embodiment of the present disclosure.

Although the present disclosure may be susceptible to various modifications and alternative forms, specific embodiments thereof have been shown by way of examples in the drawings and have been described in detail herein. However, it should be understood that the description of specific embodiments herein is not intended to limit the present disclosure to the particular forms disclosed, but rather to cover all modifications, equivalents, and alternatives falling within the spirit and scope of the present disclosure. It should be noted that same or similar reference numerals are used throughout the drawings to refer to the same or like parts.

DETAILED DESCRIPTION OF EMBODIMENTS

The embodiments of the present disclosure will be described completely in conjunction with the drawings. The following description is only exemplary, and is not intended to limit the present disclosure, and applications or usages thereof.

Exemplary embodiments are provided so that the present disclosure will be thorough and complete, and will fully convey the scope of the present disclosure to those skilled in the art. Numerous specific details, such as examples of specific components, devices, and methods, are described to provide a detailed understanding of the embodiments of the present disclosure. It is apparent for those skilled in the art that the exemplary embodiments may be implemented in many different forms without specific details, and should not be construed to limit the scope of the present disclosure. In some exemplary embodiments, well-known processes, well-known structures, and well-known technologies are not described in detail.

The descriptions are provided in the following order:
1. Configuration examples of a network side device;
2. Configuration examples of a user equipment;
3. Method embodiments; and
4. Application examples.

<1. Configuration Examples of a Network Side Device>

FIG. 1 is a block diagram showing a configuration example of an electronic device 100 according to an embodiment of the present disclosure. The electronic device 100 may be used as a network side device in a wireless communication system, and specifically may be used as a base station device in the wireless communication system.

According to an embodiment of the present disclosure, the wireless communication system may include a TN or an NTN. That is, the electronic device 100 may be a network side device located on the ground, or a network side device located on a satellite device.

As shown in FIG. 1, the electronic device 100 may include a division unit 110, a determination unit 120, a generation unit 130, and a communication unit 140.

All the units of the electronic device 100 may be included in processing circuitry. It should be noted that the electronic device 100 may include one processing circuitry or multiple processing circuitry. Further, the processing circuitry may include various discrete functional units to perform various functions and/or operations. It should be noted that the functional units may be physical entities or logical entities, and units with different titles may be implemented by the same physical entity.

According to an embodiment of the present disclosure, the division unit 110 may be configured to divide a service region of the electronic device 100 into multiple regions based on location information, and allocate one or more user equipments in each of the regions to a same TAG. The user equipments in each of the regions belong to the same TAG, that is, the regions correspond to the TAGs one-to-one, thus the regions are referred to as TAG regions in the present disclosure.

According to an embodiment of the present disclosure, the determination unit 120 may be configured to determine a TA value corresponding to each of the TAGs.

According to an embodiment of the present disclosure, the generation unit 130 may be configured to generate TA information. The TA information includes a TA value corresponding to a TAG allocated for a user equipment.

According to an embodiment of the present disclosure, the electronic device 100 may be configured to transmit the TA information generated by the generation unit 130 to the user equipment via the communication unit 140. The user equipment uses the TA value corresponding to the TAG allocated for the user equipment as a TA value between the user equipment and the electronic device 100.

As described above, the service region of the electronic device 100 according to the present disclosure is divided into multiple TAG regions, each of the TAG corresponds to a TA value, and the user equipment may use the TA value corresponding to the TAG allocated for the user equipment as the TA value between the user equipment and the electronic device 100. Thus, the TA value is configured and updated for each of the TAGs, so that the user equipments in the same TAG uses the same TA value, avoiding configuring and updating the TA value for each of user equipments, thereby reducing signaling overhead caused by updating TA values.

Figure 2:
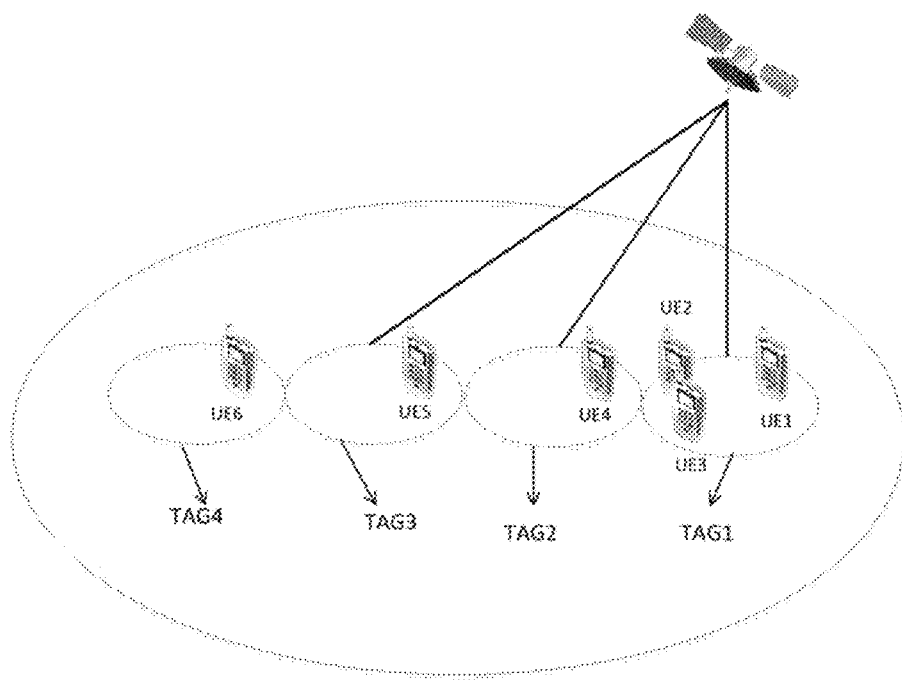
FIG. 2 is a schematic diagram showing TAG regions and division of TAGs according to an embodiment of the present disclosure.

FIG. 2 is a schematic diagram showing TAG regions and division of TAGs according to an embodiment of the present disclosure. In FIG. 2, the electronic device 100 may be located on a satellite device. FIG. 2 shows an example of four TAG regions in the service region of the electronic device 100. The four TAG regions correspond to four TAGs: TAG1, TAG2, TAG3, and TAG4. UE1, UE2, and UE3 in a first TAG region are allocated to TAG1, UE4 in a second TAG region is allocated to TAG2, UE5 in a third TAG region is allocated to TAG3, and UE6 in a fourth TAG region is allocated to TAG4. For ease of description, FIG. 2 only shows four TAGs, and there may actually be more or fewer TAGs.

According to an embodiment of the present disclosure, the division unit 110 may be configured to determine a size of each of the TAG regions based on a TA resolution requirement of the wireless communication system where the electronic device 100 is located. For example, the division unit 110 may determine the size of each of the TAG regions based on a predetermined threshold for differences between TA values of the user equipments in each of the TAG regions. In addition, the shapes of the TAG regions may be flexible, and may be two-dimensional shapes or three-dimensional shapes. The two-dimensional shapes include, but are not limited to, rectangles, circles and hexagons. The three-dimensional shapes include, but are not limited to, spheres.

According to an embodiment of the present disclosure, the determination unit 120 may be configured to determine a TA value corresponding to each of the TAGs. FIG. 3 is a schematic diagram showing a mapping relationship between TAGs and TA values that is determined by the determination unit 120 according to an embodiment of the present disclosure. As shown in FIG. 3, TAG1 corresponds to TA value 1, TAG2 corresponds to TA value 2, TAG3 corresponds to TA value 3, and TAG4 corresponds to TA value 4.

Therefore, each of the TAGs corresponds to a TA value, so that each of the user equipments in the TAG uses the TA value as the TA value between the user equipment and the electronic device 100. Compared with configuring and updating a TA value is for each of the user equipments according to the traditional technology, the TA value is configured and updated for each of the TAGs according to the present disclosure, effectively reducing complexity of updating TA values, and thereby reducing signaling overhead caused by updating TA values.

It should be noted that the TAG according to the present disclosure is different from the TAG according to the conventional technology. According to the conventional technology, the TAG usually includes multiple serving cells with a same TA value. That is, the TA values between the user equipment and the serving cells in the TAG are the same. According to the present disclosure, TAG includes user equipments with a same TA value. That is, the TA values between the user equipments in the TAGs and the electronic device 100 are the same.

According to an embodiment of the present disclosure, the determination unit 120 may be configured to determine a TA value between each of the user equipments and the electronic device 100. For example, the determination unit 120 may determine a TA value between a user equipment and the electronic device 100 based on a random access preamble transmitted by the user equipment. Further, the determination unit 120 may determine a TA value corresponding to a TAG based on TA values between all user equipments in the TAG and the electronic device 100. For example, the determination unit 120 may perform an algorithm, such as average or weighted average, on the TA values between all the user equipments in the TAG and the electronic device 100 to determine the TA value corresponding to the TAG.

According to an embodiment of the present disclosure, the division unit 110 may be configured to allocate a TAG to the user equipment based on location information of the user equipment.

According to an embodiment of the present disclosure, the electronic device 100 may be configured to obtain location information of a user equipment from the user equipment via the communication unit 140. For example, the electronic device 100 may obtain the location information of the user equipment through MSG3 (message 3) in a random access process with four steps. The electronic device 100 may obtain location information of a user equipment through MSG1 (message 1) in a random access process with two steps. Further, the division unit 110 may be configured to determine a TAG to which the user equipment belongs based on the location information of the user equipment.

According to an embodiment of the present disclosure, the electronic device 100 may be configured to transmit identification information of the TAG allocated for the user equipment to the user equipment.

According to an embodiment of the present disclosure, the electronic device 100 may be configured to assign a globally unique identifier to each of the TAGs in the service region of the electronic device 100. Each of TAGs in service regions of other network side devices may also be assigned a globally unique identifier. The globally unique identifiers of the TAGs may be called G-TAG IDs. The electronic device 100 may determine a G-TAG ID for the TAG to which the user equipment belongs based on the location information of the user equipment, and transmit the G-TAG ID allocated for the user equipment to the user equipment.

According to an embodiment of the present disclosure, the user equipment may store location information of each of the TAG regions and the corresponding G-TAG ID in advance. The location information of each of the TAG regions may be provided based on the shape of the TAG region. For example, location information of a TAG region in a rectangular shape may include coordinates of two points on a diagonal, location information of a TAG region in a circular shape may include coordinates of an origin and a value of a radius, location information of a TAG region in a hexagonal shape may include coordinates of a center point and a value of a side length, and location information of a TAG region in a spherical shape may include coordinates of a center point and a value of a radius. In addition, the location information of each of the TAG regions is information about an absolute location of the TAG region in space.

According to an embodiment of the present disclosure, the electronic device 100 may be configured to allocate a cell unique identifier for each of the TAGs in the service region of the electronic device 100. The locally unique identifier may be called L-TAG ID. Since the user equipment stores the G-TAG ID of each of the TAG regions in advance and does not know the L-TAG ID of the TAG region, the electronic device 100 may determine an L-TAG ID of the TAG to which the user equipment belongs based on the location information of the user equipment, and transmit the L-TAG ID allocated for the user equipment to the user equipment. In this way, the number of bits of the L-TAG ID is much smaller than the number of bits of the G-TAG ID, thereby greatly reducing the signaling overhead between the electronic device 100 and the user equipment.

According to an embodiment of the present disclosure, the TA information generated by the generation unit 130 may include: identification information of TAGs in the service region of the electronic device 100 and TA values corresponding to the TAGs. The electronic device 100 may broadcast the TA information.

FIG. 4 is a schematic diagram showing TA information received by UE1 in FIG. 2 according to an embodiment of the present disclosure. As shown in FIG. 4, the TA information received by UE1 includes identification information of each of TAGs from TAG1 to TAG4 and TA values corresponding to the TAGs. Since the TA information is broadcasted, TA information received by each of the UEs in FIG. 2 is as shown in FIG. 4.

According to an embodiment of the present disclosure, the TA information generated by the generation unit 130 may include: identification information of the TAG allocated for the user equipment and a TA value corresponding to the TAG allocated for the user equipment. The electronic device 100 may multicast the TA information.

FIG. 5 is a schematic diagram showing TA information received by UE1 in FIG. 2 according to another embodiment of the present disclosure. As shown in FIG. 5, since UE1 belongs to TAG1, the TA information received by UE1 includes identification information of TAG1 and a TA value 1 corresponding to TAG1.

In this case, the TA information received by the user equipment only includes the identification information of the TAG to which the UE belongs and the TA value corresponding to the TAG. For another example, TA information received by UE2 in FIG. 2 includes the identification information of TAG1 and the TA value 1 corresponding to TAG1; TA information received by UE3 in FIG. 2 includes the identification information of TAG1 and the TA value 1 corresponding to TAG1; TA information received by UE4 in FIG. 2 includes identification information of TAG2 and a TA value 2 corresponding to TAG2; TA information received by the UE5 in FIG. 2 includes identification information of TAG3 and a TA value 3 corresponding to TAG3; and TA information received by UE6 in FIG. 2 includes identification information of TAG4 and a TA value 4 corresponding to TAG4.

According to an embodiment of the present disclosure, the generation unit 130 may be configured to configure different RNTIs (radio network temporary identifiers) for each of the TAGs in the service region of the electronic device 100, and scramble the TA information using a RNTI corresponding to the TAG allocated for the user equipment. That is, the generation unit 130 may configure RNTI1 for TAG1, RNTI2 for TAG2, RNTI3 for TAG3, and RNTI4 for TAG4. The generation unit 130 may scramble the TA information transmitted to UE1 to UE3 using RNTI1, scramble the TA information transmitted to UE4 using RNTI2, scramble the TA information transmitted to UE5 using RNTI3, and scramble the TA information transmitted to UE6 using RNTI4.

According to an embodiment of the present disclosure, the generation unit 130 may be configured to determine a RNTI corresponding to a TAG based on identification information of the TAG (preferably L-TAG ID). The user equipment may determine the RNTI corresponding to the TAG based on the identification information of the TAG. In this way, the user equipment descrambles received TA information based on a corresponding RNTI to obtain the content of the TA information.

According to an embodiment of the present disclosure, the multiple TAG regions in the service region of the electronic device 100 may be grouped into multiple TAG clusters. The TA information generated by the generation unit 130 may include identification information of TAGs in a TAG cluster in which the TAG allocated for the user equipment is included and TA values corresponding to the TAGs. The electronic device 100 may multicast the TA information.

Figures 6, 7, 8:
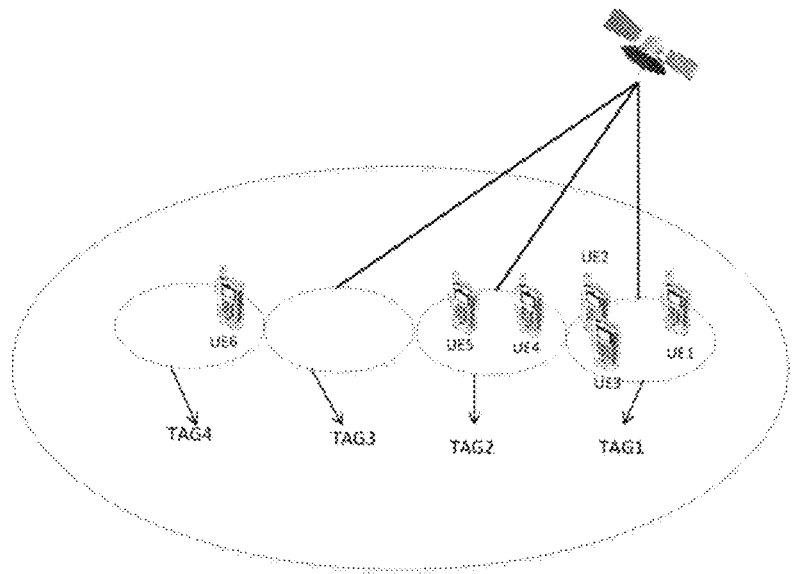
FIG. 6 is a schematic diagram showing TA information received by UE1 in FIG. 2 according to another embodiment of the present disclosure.
FIG. 7 is a schematic diagram showing TAG regions and division of TAGs after UE5 moves.
FIG. 8 is a schematic diagram showing a mapping relationship between TAGs and TA values after UE5 moves.

FIG. 6 is a schematic diagram showing TA information received by UE1 in FIG. 2 according to another embodiment of the present disclosure. It is assumed that the TAGs in FIG. 2 is grouped into clusters, TAG1 and TAG3 are included in a first TAG cluster, and TAG2 and TAG4 are included in a second TAG cluster. As shown in FIG. 6, since UE1 belongs to TAG1, the TA information received by UE1 includes identification information of TAGs (TAG1 and TAG3) in a TAG cluster in which TAG1 is included and TA values corresponding to the TAGs.

In this case, the generation unit 130 may be configured to configure an unique RNTI for each of the TAG clusters, and scramble the TA information using a RNTI corresponding to the TAG cluster in which the TAG allocated for the user equipment is included. That is, the generation unit 130 may allocate RNTI1 for a first TAG cluster, allocate RNTI2 for a second TAG cluster, scramble the TA information received by UE1, UE2, UE3, and UE5 using RNTI1, and scramble the TA information received by UE4 and UE6 using RNTI2.

According to an embodiment of the present disclosure, the generation unit 130 may be configured to determine a RNTI corresponding to a TAG based on identification information (preferably L-TAG ID) of the TAG. For example, assuming that the number of RNTI is N, that is, the number of TAG clusters is N, and the initial RNTI is $RNTI_0$, the process of determining a RNTI based on the identification information of the TAG may be performed as follows. First, an offset value of RNTI is calculated by using the following equation:

$$RNTI_{offset} = TAG\ ID\ \%\ N(\text{where \% represents a remainder operation})$$

Then, calculation is performed by using the following equation:

$$RNTI = RNTI_0 + RNTI_{offset}$$

That is, TAGs with the same RNTI are included in the same TAG cluster. The TAGs are grouped into N clusters, and each of the clusters corresponds to an RNTI. In addition, the user equipment may determine a RNTI corresponding to a TAG based on TAG ID by using a similar method. In this way, the user equipment may descramble the TA information based on a corresponding RNTI to obtain the TA information, and further determine the TA value corresponding to the TAG where the user equipment is located based on the identification information of the TAG. Apparently, the process of determining a RNTI corresponding to a TAG based on the identification information of the TAG is not limited to the above embodiment.

According to the embodiments of the present disclosure, the TAGs are grouped into clusters, and an unique RNTI is assigned to each of the clusters, effectively avoiding the problem of insufficient RNTI due to too many TAGs.

According to an embodiment of the present disclosure, in a case that the user equipment stores the location information of each of the TAG regions and the corresponding G-TAG ID, the user equipment may determine whether it is required to update the L-TAG ID based on the location information of the user equipment. For example, in a case that the user equipment moves out of the TAG where the user equipment is originally located, the user equipment may determine to update the L-TAG ID. According to an embodiment of the present disclosure, the electronic device 100 may be configured to receive updated location information from the user equipment, re-allocate a TAG to the user equipment based on the updated location information of the user equipment, and transmit identification information (preferably L-TAG ID) of the re-allocated TAG to the user equipment. The electronic device 100 may be configured to re-determine TA information based on the change of the TAG allocated for the user equipment. For example, in a case that a TAG does not include any user equipment due to the movement of one or some user equipments, the determination unit 120 does not determine a TA value corresponding to the TAG, and the generation unit 130 may delete identification information and a TA value corresponding to the TAG from the TA information.

FIG. 7 is a schematic diagram showing TAG regions and division of TAGs after UE5 moves. As shown in FIG. 7, UE5 moves out of TAG3 where UE5 is originally located. In this case, UE5 may transmit updated location information to the electronic device 100, and receive identification information of a TAG (that is, identification information of TAG2) newly allocated for UE5 from the electronic device 100. Since TAG3 no longer includes any user equipment, TA values corresponding to TAGs, determined by the determination unit 120, no longer includes the TA value corresponding to TAG3.

FIG. 8 is a schematic diagram showing a mapping relationship between TAGs and TA values after UE5 moves. As shown in FIG. 8, TAG1 includes UE1 to UE3, TAG2 includes UE4 and UE5, and TAG4 includes UE6. The determination unit 120 determines a TA value 1 corresponding to TAG1, a TA value 2 corresponding to TAG2, and a TA value 4 corresponding to TAG4.

Figure 9:
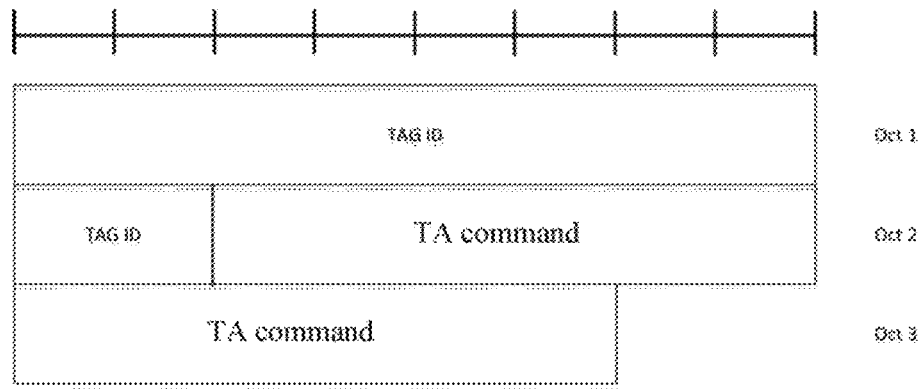
FIG. 9 is a schematic diagram showing a content of MAC CE (Media Access Control Control Element) according to an embodiment of the present disclosure.

According to an embodiment of the present disclosure, the electronic device 100 may carry the TA information generated by the generation unit 130 through a TAC (Timing Advance Command), and transmit the TAC on a PDSCH (Physical Downlink Shared Channel). The TAC may be carried through MAC CE. FIG. 9 is a schematic diagram showing a content of MAC CE according to an embodiment of the present disclosure. As shown in FIG. 9, the MAC CE may include a TAG ID field and a TAC field, and the TAG ID field preferably includes an L-TAG ID.

According to an embodiment of the present disclosure, the generation unit 130 may periodically generate updated TA information, and the electronic device 100 may periodically broadcast or multicast the TA information generated by the generation unit 130.

Figure 10:
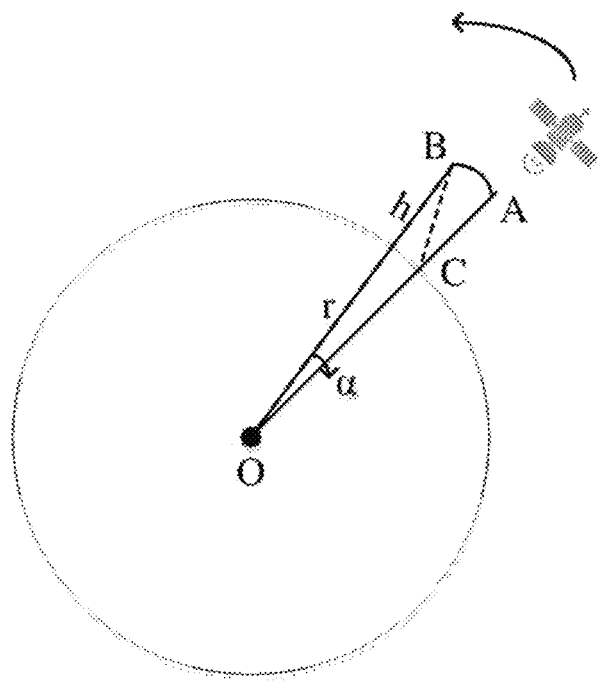
FIG. 10 is a schematic diagram showing a movement process of a satellite according to an embodiment of the present disclosure.

FIG. 10 is a schematic diagram showing a movement process of a satellite according to an embodiment of the present disclosure. As shown in FIG. 10, it is assumed that the satellite moves from point A to point B, point C is an intersection of a line (from a earth center O to point A) and the ground. In a case that $|BC-AC| \geq T_{cp}*c$, it is determined to update the TA value corresponding to point C, where $T_{cp}$ is equal to 5.2 us and represents a length of CP, and c is equal to $3*10^8$ m/s and represents the speed of light. That is, the time period for the satellite to move from point A to point B may be considered as a maximum period for updating the TA information. It is well known that the average radius r of the earth is equal to 6371 km, and the height h of the satellite is set to 700 km. Thus, the time period T for the satellite to move from point A to point B may be calculated by using the following equations:

$$\cos\alpha = \frac{OC^2 + OB^2 - BC^2}{2OC \cdot OB} =$$

$$\frac{r^2 + (r+h)^2 - (h + T_{cp} \cdot c)^2}{2r \cdot (r+h)} = \alpha \approx 0.007(\text{rad}) \therefore T = \frac{a}{2\pi} \cdot T_{S2E} \approx 6(s).$$

In the above equations, a represents an angle between OA and OB, $T_{S2E}$ represents a period of the satellite moving around the earth, and is set to 90 minutes in a case of a LEO (Low Earth Orbit) satellite.

Therefore, a maximum period for TA information to be updated is approximately equal to 6 seconds. According to an embodiment of the present disclosure, the update period for TA information may be set to several hundreds of milliseconds to several seconds.

As described above, according to an embodiment of the present disclosure, the electronic device 100 may periodically update the TA value corresponding to each of the TAGs, and the electronic device 100 may periodically broadcast or multicast the TA information, applying to a communication system including a TN, a communication system including an NTN, or a communication system including a TN and an NTN.

For a UE with multi-connection capability, the UE may connect to an NTN-gNB and a TN-gNB simultaneously. Due to the high transmission power and short connection time of the UE due to the long communication distance and fast movement of the satellite, the NTN is usually used as a supplement to TN coverage. That is, in a scenario, a TN-gNB may be used as a primary cell (PCell), and an NTN-gNB can be used as a secondary cell (SCell). In a case of a low traffic load, the SCell may be deactivated, and the NTN-gNB does not obtain any information from the UE for a long time.

Figure 11:
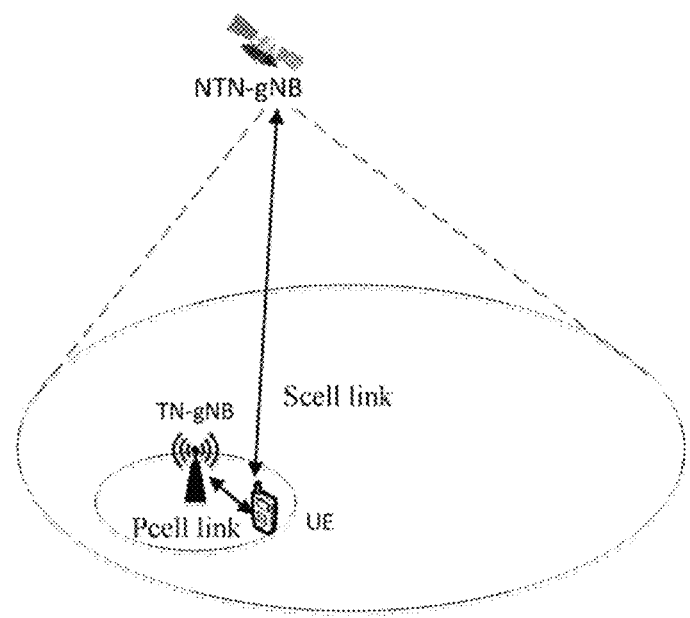
FIG. 11 is a schematic diagram showing a scenario in which a UE with multi-connection capability is connected to a TN-gNB (Terrestrial network-base station equipment in a 5G communication system) and to an NTN-gNB according to an embodiment of the present disclosure.

FIG. 11 is a schematic diagram showing a scenario in which a UE with multi-connection capability is connected to a TN-gNB and to an NTN-gNB according to an embodiment of the present disclosure. As shown in FIG. 11, the UE is connected to both NTN-gNB and TN-gNB simultaneously. TN-gNB is used as a PCell, and NTN-gNB is used as a SCell. The UE communicates with the TN-gNB through a PCell link, and communicates with the NTN-gNB through a SCell link. It is assumed that the SCell is deactivated. According to the embodiments of the present disclosure, the TN-gNB may be used to assist the NTN-gNB in allocating or reallocating TAGs for UEs.

According to an embodiment of the present disclosure, in a case that the electronic device 100 is a network side device located on a satellite device, the electronic device 100 may be configured to receive location information of a user equipment from a network side device located on the ground, and allocate a TAG for the user equipment based on the location information of the user equipment. Further, the electronic device 100 may transmit identification information of the TAG allocated for the user equipment to the network side device on the ground, so that the network side device on the ground transmits the identification information of the TAG allocated for the user equipment to the user equipment. In this case, the user equipment is simultaneously connected to the electronic device 100 and the network side device located on the ground.

Figure 12:
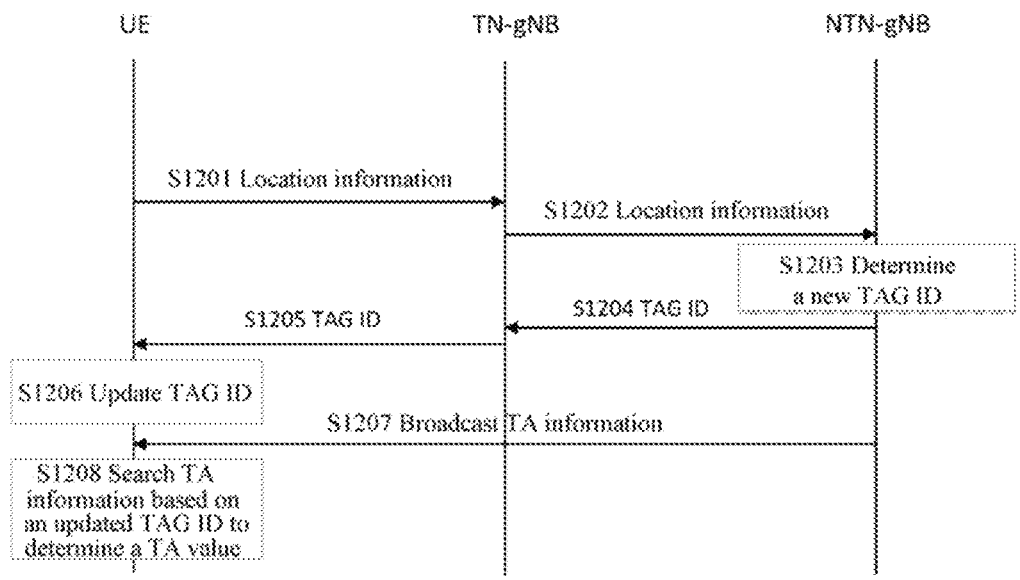
FIG. 12 is a signaling flowchart showing a TN-gNB assisting an NTN-gNB to update a TAG ID of a UE according to an embodiment of the present disclosure.

FIG. 12 is a signaling flowchart showing a TN-gNB assisting an NTN-gNB to update a TAG ID of a UE according to an embodiment of the present disclosure. In FIG. 12, the NTN-gNB may be implemented by the electronic device 100. As shown in FIG. 12, in step S1201, in a case that the UE is to wake up the SCell, the UE transmits location information to the TN-gNB. In step S1202, the TN-gNB forwards the location information of the UE to the NTN-gNB. In step S1203, the NTN-gNB allocates a TAG for the UE based on the location information of the UE. In step S1204, the NTN-gNB transmits an ID of the allocated TAG to the TN-gNB. In step S1205, the TN-gNB forwards the ID of the allocated TAG to the UE. In step S1206, the UE updates the TAG ID stored in the UE. In step S1207, the NTN-gNB broadcasts the TA information. In step S1208, the UE searches for a TA value corresponding to the updated TAG ID in the TA information based on the updated TAG ID. Thus, with the assistance of the TN-gNB, the UE obtains the updated TAG ID and obtains the TA value based on the updated TAG ID.

Figure 13:
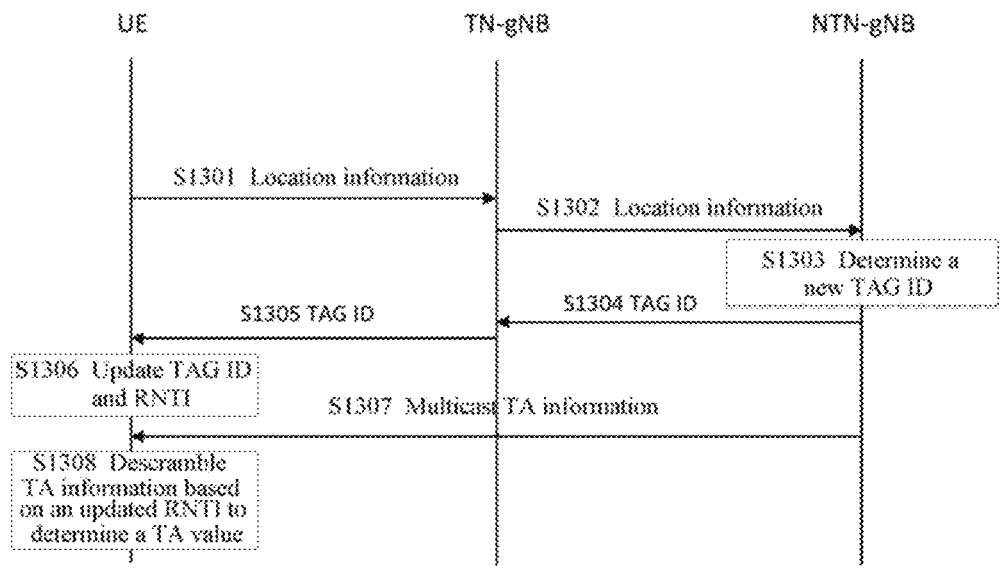
FIG. 13 is a signaling flowchart showing a TN-gNB assisting an NTN-gNB to update a TAG ID of a UE according to another embodiment of the present disclosure.

FIG. 13 is a signaling flowchart showing a TN-gNB assisting an NTN-gNB to update a TAG ID of a UE according to another embodiment of the present disclosure. In FIG. 13, the NTN-gNB may be implemented by the electronic device 100. As shown in FIG. 13, in step S1301, in a case that the UE is to wake up the SCell, the UE transmits location information to the TN-gNB. In step S1302, the TN-gNB forwards the location information of the UE to the NTN-gNB. In step S1303, the NTN-gNB allocates a TAG for the UE based on the location information of the UE. In step S1304, the NTN-gNB transmits an ID of the allocated TAG to the TN-gNB. In step S1305, the TN-gNB forwards the ID of the allocated TAG to the UE. In step S1306, the UE updates the TAG ID and RNTI stored in the UE. In step S1307, the NTN-gNB multicasts the TA information. In step S1308, the UE descrambles the received TA information with the updated RNTI to obtain a TA value corresponding to the updated TAG ID. In a case that the TAGs are grouped into clusters, the UE descrambles the received TA information based on the updated RNTI to obtain TAG IDs and TA values of TAGs in a TAG cluster where the TAG to which the UE belongs is included, and then determines a TA value corresponding to the TAG to which the UE belongs based on the updated TAG ID. Thus, with the assistance of the TN-gNB, the UE obtains the updated TAG ID and obtains the TA value based on the updated TAG ID.

As described above, with the electronic device 100 according to the present disclosure, the service region of the electronic device 100 serving as the network side device is divided into multiple TAG regions, each of the TAG corresponds to a TA value, and the user equipment may use the TA value corresponding to the TAG allocated for the user equipment as the TA value between the user equipment and the electronic device. Further, the electronic device 100 may periodically update the TA value of each of the TAGs, and broadcast or multicast the TA information. Thus, the TA value is configured and updated for each of the TAGs, so that the user equipments in the same TAG uses the same TA value, avoiding configuring and updating the TA value for each of user equipments, thereby reducing signaling overhead caused by updating TA values.

According to an embodiment of the present disclosure, as shown in FIG. 1, the electronic device 100 may further include a division unit 150, a configuration unit 160, and a generation unit 170.

According to an embodiment of the present disclosure, the division unit 150 may be configured to divide a service region of the electronic device 100 into multiple regions based on location information.

According to an embodiment of the present disclosure, the configuration unit 160 may be configured to configure, for each of the resource regions, resources for transmitting preambles, so that user equipments in a same resource region transmit preambles using same resources, and user equipments in different resource regions transmit preambles using orthogonal resources. Since the regions divided by the division unit 150 is used to distinguish resources for transmitting preambles, that is, the regions correspond to the resources for transmitting the preambles one-to-one, the regions are referred to as resource regions in the present disclosure.

According to an embodiment of the present disclosure, the generation unit 170 may be configured to generate service region information. The electronic device 100 may transmit the service region information of the electronic device 100 to the user equipment via the communication unit 140. The user equipment determines a resource region to which the user equipment belongs based on location information of the user equipment and the service region information of the electronic device, and determines resources for transmitting a preamble based on the resource region to which the user equipment belongs to transmit the preamble.

As described above, the service region of the electronic device 100 serving as the network side device is divided into multiple resource regions, and each of the resource regions is configured with resources for transmitting preambles. Thus, user equipments in a same resource region transmit preambles using same resources, and user equipments in different resource regions transmit preambles using orthogonal resources. In this way, user equipments in different locations can use orthogonal resources, reducing the probability of collision of preambles, thereby increasing the probability of success with one access operation.

According to an embodiment of the present disclosure, the division unit 150 divides the service region of the electronic device 100 into multiple resource regions, and the division unit 110 divides the service region of the electronic device 100 into multiple TAG regions. The division unit 150 and the division unit 110 perform completely independent division processes. Generally, the sizes of the resource regions divided by the division unit 150 are larger than the sizes of the TAG regions divided by the division unit 110.

Figure 14:
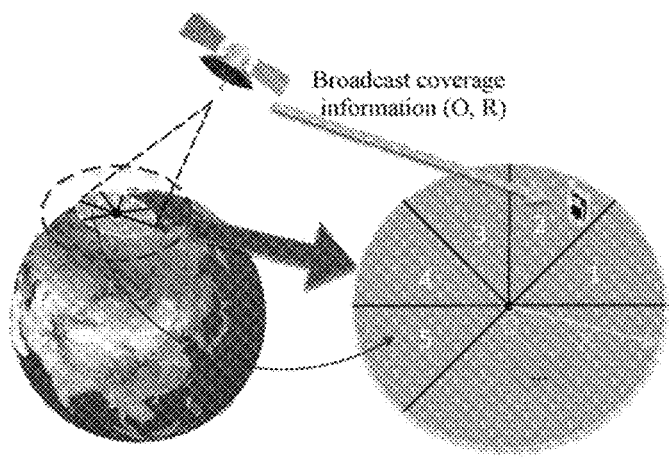
FIG. 14 is a schematic diagram showing division of resource regions according to an embodiment of the present disclosure.

FIG. 14 is a schematic diagram showing division of resource regions according to an embodiment of the present disclosure. As shown in FIG. 14, the electronic device 100 is implemented as a network side device located on a satellite device. The service region of the electronic device 100 is in a circular shape, and is divided into multiple resource regions. Each of the each resource regions is in a fan shape. Although FIG. 14 shows an example in which the resource region is in a fan shape, the resource region is not limited to in the fan shape and may be in any shape. In addition, the resource region may be in a two-dimensional shape or a three-dimensional shape.

According to an embodiment of the present disclosure, the resources for transmitting preambles include time domain resources and frequency domain resources. That is, the configuration unit 160 configures time domain resources and frequency domain resources for transmitting preambles for each of the resource regions. Further, orthogonal resources may include resources that are orthogonal in time domain or resources that are orthogonal in frequency domain. That is, in a case that two resources are orthogonal in at least one of the time domain and the frequency domain, the two resources are orthogonal resources.

Figures 15, 16:
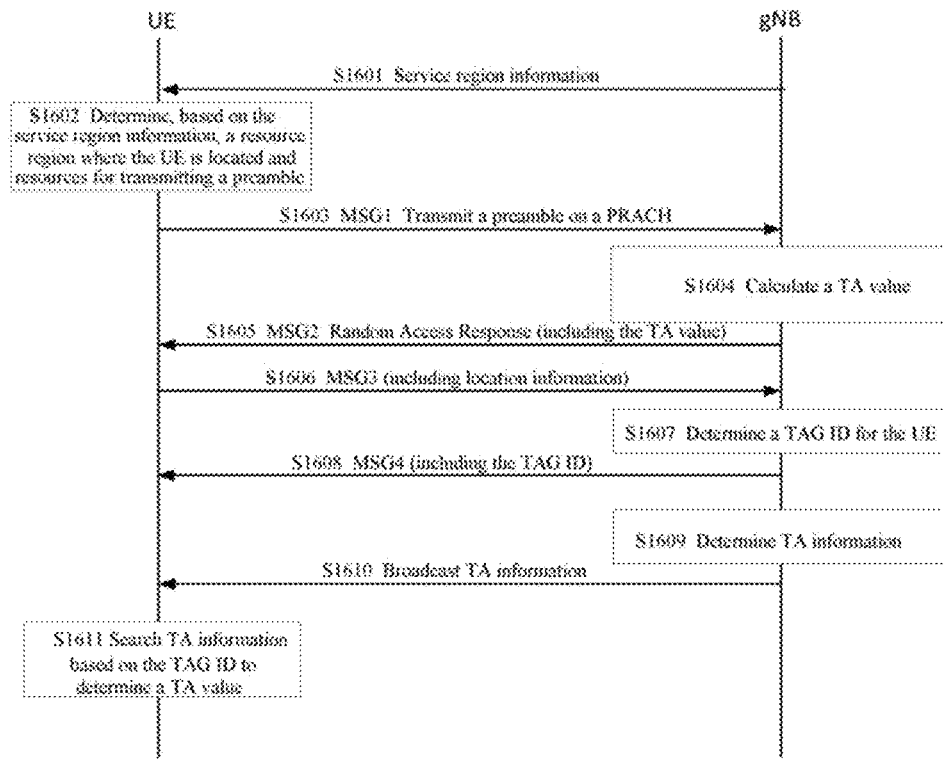
FIG. 15 is a schematic diagram showing a mapping relationship between resource regions and resources for transmitting preambles according to an embodiment of the present disclosure.
FIG. 16 is a signaling flowchart showing a process of transmitting a preamble and obtaining a TA value according to an embodiment of the present disclosure.

FIG. 15 is a schematic diagram showing a mapping relationship between resource regions and resources for transmitting preambles according to an embodiment of the present disclosure. As shown in FIG. 15, the service region of the electronic device 100 includes N resource regions. The configuration unit 160 configures resources of subframe 1 and RB1 for resource region 1 for transmitting preambles, configures resources of subframe 2 and RB2 for resource region 2 for transmitting preambles, configures resources of subframe 3 and RB3 for resource region 3 for transmitting preambles, . . . , and configures resources of subframe N and RBN for resource region N for transmitting preambles. FIG. 15 shows a situation in which resources are orthogonal in both the time domain and the frequency domain. In practice, the resources may be orthogonal in the time domain or the frequency domain.

According to an embodiment of the present disclosure, both the user equipment and the electronic device 100 may be configured to pre-store the location information of each of the resource regions and the resources configured for each of the resource regions for transmitting preambles. It should be noted that the location information of each of the resource regions is information about a relative location of the resource region in the service region of the electronic device 100, and the user equipment does not know the absolute location of each of the resource regions in space. That is, the user equipment only knows that resource region 1 is a region located at upper right of the service region of the electronic device 100, and does not know the actual location of the resource region 1 in space. The reason is that the location of the service region of the electronic device 100 in space is changeable.

According to an embodiment of the present disclosure, the generation unit 170 may be configured to generate service region information of the electronic device 100, that is, location information of the service region of the electronic device 100. For example, in a case that the service region of the electronic device 100 is a circular region, the service region information generated by the generation unit 170 may include a location of the center O of the circular region and a size of the radius R of the circular region. Further, the electronic device 100 may be configured to broadcast the service region information of the electronic device 100. Therefore, after obtaining the service region information of the electronic device 100, the user equipment determines an absolute location of the service region of the electronic device in space, and then determines an absolute location of each of the resource regions in space based on the pre-stored relative location of the resource region in the service region of the electronic device 100. Further, the user equipment may determine the resource region where the user equipment is located based on the location information of the user equipment, and then may determine resources for transmitting a preamble based on the mapping relationship between the resource regions and the resources.

In the foregoing, the process of the electronic device 100 dividing the TAG regions so that the user equipment obtains the TA value and the process of the electronic device 100 dividing the resource regions so that the user equipment obtains resources for transmitting preambles are described. It should be understood by those skilled in the art that these two processes are independent. That is, in order to perform the process of dividing TAG regions so that the user equipment obtains the TA value according to the embodiments of the present disclosure, the electronic device 100 may include a division unit 110, a determination unit 120, a generation unit 130, and a communication unit 140. Further, in order to perform the process of dividing resource regions so that the user equipment obtains resources for transmitting preambles according to the embodiments of the present disclosure, the electronic device 100 may include a division unit 150, a configuration unit 160, a generation unit 170, and a communication unit 140. Apparently, the electronic device 100 may include all the units shown in FIG. 1 to perform the above two processes.

FIGS. 16 to 19 are signaling flowcharts respectively showing a process of transmitting a preamble and obtaining a TA value according to the embodiments of the present disclosure. In FIGS. 16 to 19, the electronic device 100 may be used to implement a gNB.

As shown in FIG. 16, in step S1601, a gNB transmits service region information of the gNB to a UE. In step S1602, the UE determines a location of each of resource regions based on the service region information of the gNB, determines a resource region where the UE is located based on the location of the UE, and determines resources for transmitting a preamble according to a mapping relationship between resource regions and resources. In step S1603, the UE transmits MSG1 (message 1) to the gNB, that is, transmits a preamble on a PRACH (Physical Random Access Channel) based on the resources determined in step S1602. In step S1604, the gNB calculates an initial TA value between the UE and the gNB based on a received preamble. In step S1605, the gNB transmits MSG2 (message 2), that is, a random access response, to the UE, where MSG2 includes the TA value calculated in step S1604. In step S1606, the UE transmits MSG3 (message 3) to the gNB by using the received TA value, where MSG3 includes the location information of the UE. In step S1607, the gNB determines a TAG ID of a TAG to which the UE belongs based on the location information of the UE. In step S1608, the gNB transmits MSG4 (message 4) to the UE, where MSG4 includes the ID of the TAG to which the UE belongs. In step S1609, the gNB determines a TA value of each of TAGs based on the TA values of the UEs, and generates TA information to be transmitted. In step S1610, the gNB broadcasts the TA information, and the TA information includes the ID of each of TAGs and the corresponding TA value. In step S1611, the UE searches for a TA value, corresponding to the TAG ID, from the TA information based on the TAG ID, and uses the searched TA value as a TA value between the UE and the gNB. As shown in FIG. 16, the random access process between the UE and the gNB is performed in four steps, and the gNB broadcasts the TA information.

Figure 17:
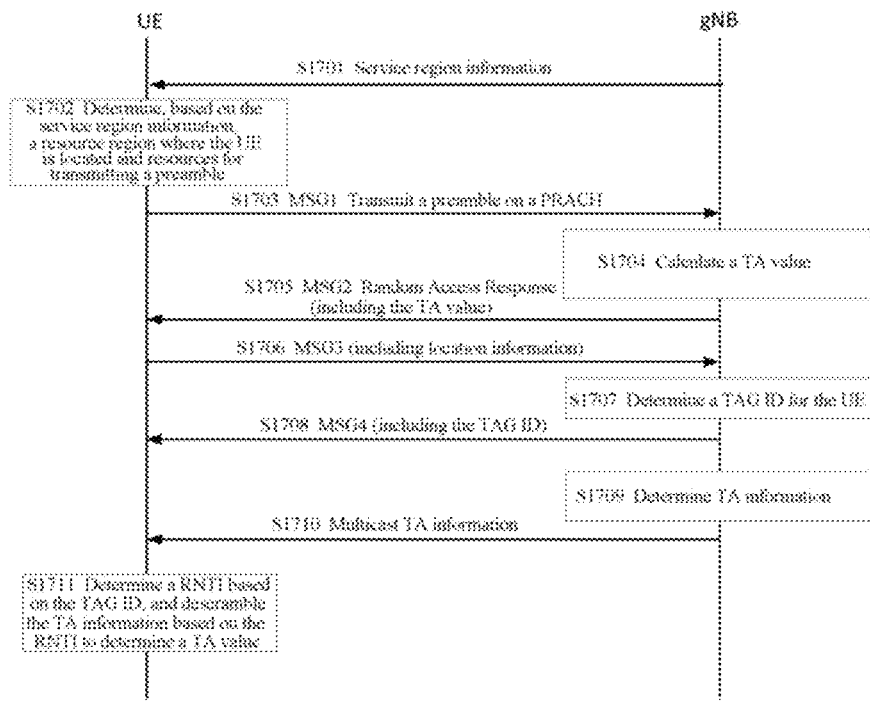
FIG. 17 is a signaling flowchart showing a process of transmitting a preamble and obtaining a TA value according to another embodiment of the present disclosure.

As shown in FIG. 17, in step S1701, a gNB transmits service region information of the gNB to a UE. In step S1702, the UE determines a location of each of resource regions based on the service region information of the gNB, determines a resource region where the UE is located based on the location of the UE, and determines resources for transmitting a preamble according to a mapping relationship between resource regions and resources. In step S1703, the UE transmits MSG1 (message 1) to the gNB, that is, transmits a preamble on a PRACH (Physical Random Access Channel) based on the resources determined in step S1702. In step S1704, the gNB calculates an initial TA value between the UE and the gNB based on a received preamble. In step S1705, the gNB transmits MSG2 (message 2), that is, a random access response, to the UE, where MSG2 includes the TA value calculated in step S1704. In step S1706, the UE transmits MSG3 (message 3) to the gNB by using the received TA value, where MSG3 includes the location information of the UE. In step S1707, the gNB determines a TAG ID of a TAG to which the UE belongs based on the location information of the UE. In step S1708, the gNB transmits MSG4 (message 4) to the UE, where MSG4 includes the ID of the TAG to which the UE belongs. In step S1709, the gNB determines a TA value of each of TAGs based on the TA values of the UEs, and generates TA information to be transmitted. In step S1710, the gNB broadcasts the TA information, and the TA information includes the ID of each of TAGs and the corresponding TA value. In step S1711, the UE determines a RNTI based on the TAG ID, descrambles the TA information based on the RNTI, and determines the TA information corresponding to the TAG as a TA value between the UE and the gNB. In an embodiment, in step S1710, the gNB multicasts the TA information, and the TA information may include TAGs in the TAG cluster where the TAG to which the UE belongs is included and corresponding TA values. In step S1711, the UE determines a RNTI based on the TAG ID, and descrambles the TA information based on the RNTI to determine the TAGs in the TAG cluster where the TAG to which the UE belongs is included and the corresponding TA values. Further, the UE determines a TA value corresponding to a TAG to which the UE belongs based on the TAG ID of the TAG, and uses TA value as a TA value between the UE and the gNB. As shown in FIG. 17, the random access process between the UE and the gNB is performed in four steps, and the gNB multicasts the TA information.

Figure 18:
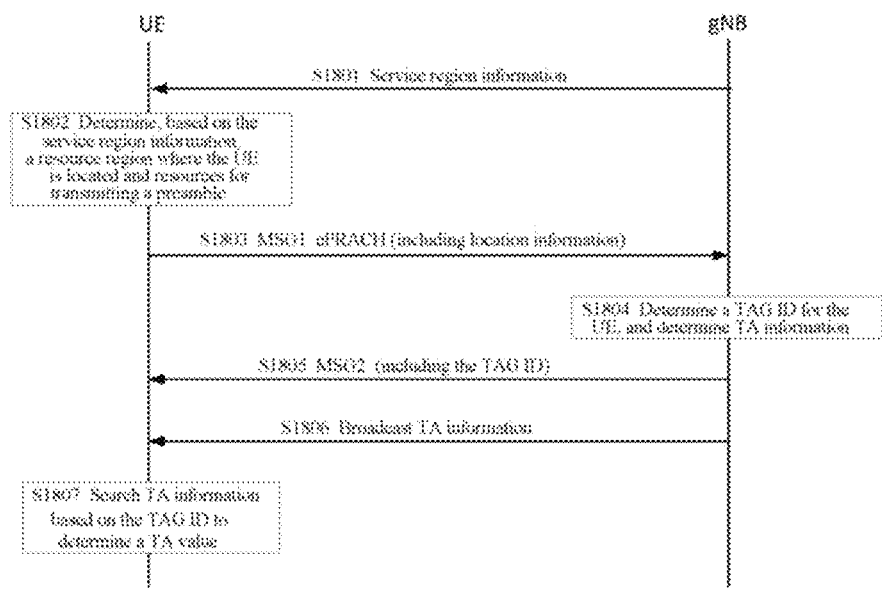
FIG. 18 is a signaling flowchart showing a process of transmitting a preamble and obtaining a TA value according to another embodiment of the present disclosure.

As shown in FIG. 18, in step S1801, a gNB transmits service region information of the gNB to a UE. In step S1802, the UE determines a location of each of resource regions based on the service region information of the gNB, determines a resource region where the UE is located based on the location of the UE, and determines resources for transmitting a preamble according to a mapping relationship between resource regions and resources. In step S1803, the UE transmits MSG1 (message 1) to the gNB, that is, the UE transmits a preamble on an ePRACH (enhanced Physical Random Access Channel) based on the resources determined in step S1802. In addition, MSG1 also includes location information of the UE. In step S1804, the gNB determines a TAG ID of a TAG to which the UE belongs based on the location information of the UE, calculates a TA value between the UE and the gNB based on the received preamble, determines a TA value of each of the TAGs based on TA values of UEs, and generates TA information to be transmitted. In step S1805, the gNB transmits MSG2 (message 2) to the UE, and MSG2 includes the ID of the TAG to which the UE belongs. In step S1806, the gNB broadcasts the TA information, and the TA information includes the ID of each of the TAGs and the corresponding TA values. In step S1807, the UE searches for a TA value corresponding to the TAG ID from the TA information based on the TAG ID as a TA value between the UE and the gNB. As shown in FIG. 18, the random access process between the UE and the gNB is performed in two steps, and the gNB broadcasts the TA information.

Figure 19:
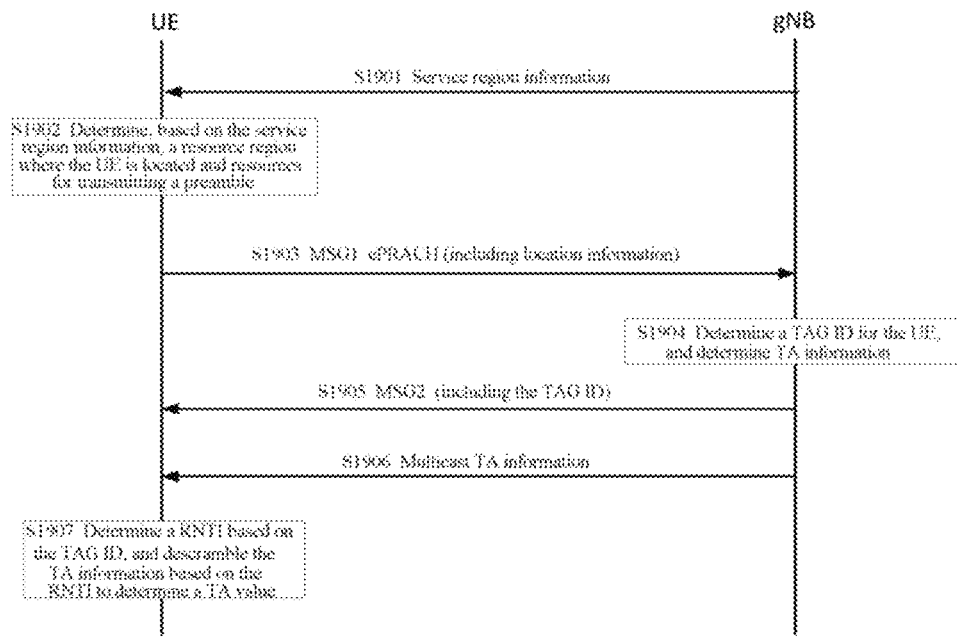
FIG. 19 is a signaling flowchart showing a process of transmitting a preamble and obtaining a TA value according to another embodiment of the present disclosure.

As shown in FIG. 19, in step S1901, a gNB transmits service region information of the gNB to a UE. In step S1902, the UE determines a location of each of resource regions based on the service region information of the gNB, determines a resource region where the UE is located based on the location of the UE, and determines resources for transmitting a preamble according to a mapping relationship between resource regions and resources. In step S1903, the UE transmits MSG1 (message 1) to the gNB, that is, the UE transmits a preamble on an ePRACH (enhanced Physical Random Access Channel) based on the resources determined in step S1902. In addition, MSGlo includes location information of the UE. In step S1904, the gNB determines a TAG ID of a TAG to which the UE belongs based on the location information of the UE, calculates a TA value between the UE and the gNB based on the received preamble, determines a TA value of each of the TAGs based on TA values of UEs, and generates TA information to be transmitted. In step S1905, the gNB transmits MSG2 (message 2) to the UE, and MSG2 includes the ID of the TAG to which the UE belongs. In step S1906, the gNB multicasts the TA information, and the TA information may include the ID of the TAG to which the UE belongs and the corresponding TA value. In step S1907, the UE determines a RNTI based on the TAG ID, descrambles the TA information based on the RNTI, and determines TA information corresponding to the TAG as a TA value between the UE and the gNB. In an embodiment, in step S1906, the gNB multicasts the TA information, and the TA information may include TAGs in a TAG cluster where the TAG to which the UE belongs is included and the corresponding TA values. In step S1907, the UE determines a RNTI according to the TAG ID, and descrambles the TA information based on the RNTI to determine TAGs in a TAG cluster where the TAG to which the UE belongs is included and the corresponding TA values. Further, the UE determines a TA value corresponding to a TAG to which the UE belongs based on the TAG ID of the TAG, and uses TA value as a TA value between the UE and the gNB. As shown in FIG. 19, the random access process between the UE and the gNB is performed in two steps, and the gNB multicasts the TA information.

As described above, with the electronic device 100 according to the present disclosure, the service region is divided into multiple TAG regions, each TAG corresponds to a TA value, and the TA value is configured and updated for each of the TAGs, so that the user equipments in the same TAG uses the same TA value, avoiding configuring and updating the TA value for each of user equipments, thereby reducing signaling overhead caused by updating TA values. Furthermore, the service region is divided into multiple resource regions, and each of the resource regions is configured with resources for transmitting preambles. Thus, user equipments in a same resource region transmit preambles using same resources, and user equipments in different resource regions transmit preambles using orthogonal resources, reducing the probability of collision of preambles, thereby increasing the probability of success with one access operation.

<2. Configuration Examples of a User Equipment>

Figure 20:
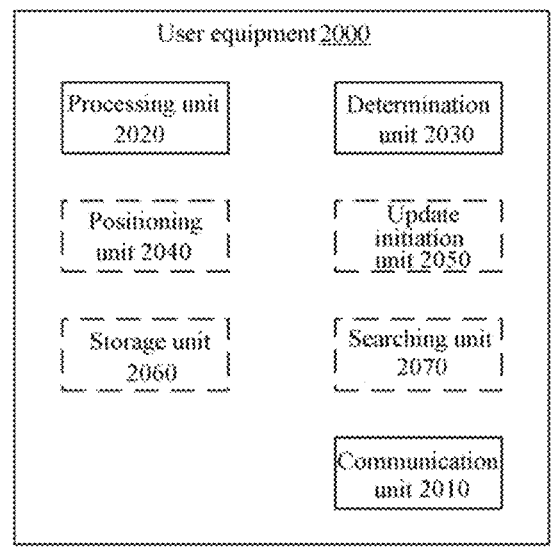
FIG. 20 is a block diagram showing a configuration example of a user equipment according to an embodiment of the present disclosure.

FIG. 20 is a block diagram showing a structure of a user equipment 2000 in a wireless communication system according to an embodiment of the present disclosure. As shown in FIG. 20, the user equipment 2000 may include a communication unit 2010, a processing unit 2020, and a determination unit 2030.

All the units of the user equipment 2000 may be included in processing circuitry. It should be noted that the user equipment 2000 may include one processing circuitry or multiple processing circuitry. Further, the processing circuitry may include various discrete functional units to perform various functions and/or operations. It should be noted that the functional units may be physical entities or logical entities, and units with different titles may be implemented by the same physical entity.

According to an embodiment of the present disclosure, the user equipment 2000 may be configured to receive TA information from a network side device via the communication unit 2010.

According to an embodiment of the present disclosure, the processing unit 2020 may be configured to decode the received TA information to determine the content of the TA information.

According to an embodiment of the present disclosure, the determination unit 2030 may be configured to determine a TA value corresponding to a TAG allocated for the user equipment 2000 based on the TA information decoded by the processing unit 2020, and use the TA value corresponding to the TAG allocated for the user equipment 2000 as a TA value between the user equipment 2000 and the network side device.

A service region of the network side device is divided into multiple TAG regions, and one or more user equipments in each of the TAG regions are allocated to a same TAG. The method for dividing TAG regions by the network side device is described in detail in the foregoing, and is not be repeated herein.

Therefore, the user equipment 2000 according to the embodiments of the present disclosure may use the TA value corresponding to the TAG where the user equipment 2000 is located as the TA value between the user equipment 2000 and the network side device, avoiding configuring and updating the TA value for each of user equipments, thereby reducing signaling overhead caused by updating TA values.

According to an embodiment of the present disclosure, as shown in FIG. 20, the user equipment 2000 may further include a positioning unit 2040 for positioning the user equipment 2000. The positioning unit 2040 may be configured to position the user equipment 2000 by various methods. For example, positioning may be performed with a GNSS (Global Navigation Satellite System), a location of the network side device with a highest RSRP (Reference Signal Receiving Power) may be regarded as a location of the user equipment 2000, and positioning may be performed with an OTDOA (Observed Time Difference of Arrival) method. The positioning method is not limited herein.

According to an embodiment of the present disclosure, the user equipment 2000 may be configured to transmit location information of the user equipment 2000 to the network side device via the communication unit 2010, and receive identification information of a TAG allocated to the user equipment 2000 based on the location information of the user equipment 2000 from the network side device via the communication unit 2010. For example, the user equipment 2000 may transmit the location information to the network side device through MSG3 in a random access process with four steps, or transmit the location information to the network side device through MSG1 in a random access process with two steps.

According to an embodiment of the present disclosure, the identification information of the TAG may be the G-TAG ID described above. In an embodiment, the identification information of the TAG may be the L-TAG ID described above. That is, the user equipment 2000 may be configured to pre-store location information of each of the TAG regions and a G-TAG ID of each of the TAG regions, and receive an L-TAG ID from the network side device.

According to an embodiment of the present disclosure, the processing unit 2020 may be configured to decode the received TA information to obtain identification information of each of the TAGs in the service region of the network side device and a TA value corresponding to each of the TAGs. Further, the determining unit 2030 may be configured to determine a TA value corresponding to a TAG allocated for the user equipment 2000 based on the TAG allocated for the user equipment 2000. Taking UE1 shown in FIG. 2 as an example, the processing unit 2020 obtains the TA information shown in FIG. 4, and the determination unit 2030 determines TA value 1 as a TA value between UE1 and the network side device based on the identification TAG ID1 of the TAG where the UE1 is located.

According to an embodiment of the present disclosure, the processing unit 2020 may be configured to determine a RNTI corresponding to a TAG allocated for the user equipment 2000 based on the ID of the TAG, and descramble the TA information based on the RNTI corresponding to the TAG allocated for the user equipment 2000 to obtain identification information of the TAG allocated for the user equipment 2000 and a TA value corresponding to the TAG allocated for the user equipment 2000. Further, the determination unit 2030 may be configured to determine the TA value corresponding to the TAG allocated for the user equipment 2000 based on the TAG allocated for the user equipment 2000. Since the TA information only includes one TA value, the determination unit 2030 may directly determine the TA value as the TA value between the user equipment 2000 and the network side device. The determination unit 2030 may determine a TA value corresponding to the TAG allocated for the user equipment 2000 as the TA value between the user equipment 2000 and the network side device based on the ID of the TAG allocated for the user equipment 2000. Taking UE1 shown in FIG. 2 as an example, the processing unit 2020 determines a RNTI corresponding to the TAG where UE1 is located based on the TAG ID1 of the TAG where UE1 is located, and descrambles TA information to obtain the TA information shown in FIG. 5. The determination unit 2030 determines TA value 1 as the TA value between UE1 and the network side device based on the identification TAG ID1 of the TAG where the UE1 is located.

According to an embodiment of the present disclosure, in a case that multiple TAG regions in the service region of the network side device are grouped into multiple TAG clusters, the processing unit 2020 may be configured to determine a RNTI corresponding to a TAG cluster in which the TAG allocated for the user equipment 2000 is included based on the ID of the TAG allocated for the user equipment 2000, and descramble the TA information based on the RNTI to obtain identification information of each of TAGs in the TAG cluster in which the TAG allocated for the user equipment 2000 is included and a TA value corresponding to each of the TAGs. Further, the determination unit 2030 may be configured to determine a TA value corresponding to the TAG allocated for the user equipment 2000 based on the TAG allocated for the user equipment 2000. Taking UE1 shown in FIG. 2 as an example (assuming that TAG1 and TAG3 are included in a first TAG cluster, and TAG2 and TAG4 are included in a second TAG cluster), the processing unit 2020 determines a RNTI corresponding to the first TAG cluster based on the TAG ID1 of the TAG to which UE1 belongs, and descrambles the TA information based on the RNTI to obtain identification Information of each of the TAGs in the first TAG cluster and a TA value corresponding to each of the TAGs as shown in FIG. 6. The determination unit 2030 may determine TA value 1 corresponding to the TAG ID1 based on the TAG ID1 of the TAG to which the UE1 belongs, and use the determined TA value 1 as the TA value between the UE1 and the network side device.

According to an embodiment of the present disclosure, as shown in FIG. 20, the user equipment 2000 may further include an update initiation unit 2050. The update initiation unit 2050 is configured to determine whether the TAG region where the user equipment 2000 is located changes based on the location information of the user equipment 2000, and cause the user equipment 2000 to transmit updated location information of the user equipment 2000 to the network side device in a case that the TAG region where the user equipment 2000 is located changes. Further, the user equipment 2000 may receive identification information of a TAG re-allocated for the user equipment 2000 from the network side device, where the identification information of the TAG re-allocated for the user equipment 2000 is determined based on the updated location information.

As mentioned above, the user equipment 2000 may pre-store location information of each of the TAG regions and the G-TAG ID of each of the TAG regions, and the positioning unit 2040 of the user equipment 2000 may locate the user equipment 2000 in real time. Thus, in a case that the user equipment 2000 determines that the user equipment 2000 moves out of a TAG region, the update initiation unit 2050 may determine that it is required for the user equipment 2000 re-to transmit location information. Then, the user equipment 2000 may receive an updated L-TAG ID from the network-side device. In this way, the TAG allocated for the user equipment 2000 is updated in time, thereby achieving better accuracy.

According to an embodiment of the present disclosure, the service region of the network side device may be divided into multiple resource regions, one or more user equipments in a same resource region are configured with same resources for transmitting preambles, and user equipments in different resource regions are configured with orthogonal resources for transmitting preambles. The method for dividing resource regions is described in detail in the foregoing, and is not repeated herein.

Further, as shown in FIG. 20, the user equipment 2000 may further include a storage unit 2060 and a searching unit 2070.

According to an embodiment of the present disclosure, the user equipment 2000 may be configured to receive service region information of the network side device from the network side device via the communication unit 2010. The service region information includes, for example, a location of a center point of the service region of the network side device and a size of a radius of the service region. According to an embodiment of the present disclosure, the user equipment 2000 may receive the service region information broadcasted by the network side device.

According to an embodiment of the present disclosure, the storage unit 2060 may store location information of each of the resource regions and resources configured for each of the resource regions for transmitting preambles. That is, the user equipment may pre-store a relative location of each of the resource regions with respect to the service region of the network side device and the resources for transmitting preambles corresponding to each of the resource regions.

According to an embodiment of the present disclosure, the searching unit 2070 may be configured to determine an absolute location of each of the resource regions in space based on the service region information of the network side device and the pre-stored relative location of each of the resource regions with respect to the service region of the network side device. Further, the searching unit 2070 may be configured to determine the resource region where the user equipment 2000 is located based on the location information of the user equipment 2000 and the absolute location of each of the resource regions in space, and then to search for resources corresponding to the resource region in a mapping relationship for transmitting preambles.

Further, the user equipment 2000 may transmit a random access preamble by using the resource determined by the searching unit 2070.

As described above, according to the embodiments of the present disclosure, the service region of the network side device is divided into multiple resource regions. User equipments in the same resource region transmit preambles using same resources, and user equipments in different resource regions transmit preambles using orthogonal resources, reducing the probability of collision of preambles from different user equipments, thereby increasing the probability of success with one access operation.

The electronic device 100 according to the embodiments of the present disclosure may be used as the network side device, that is, the electronic device 100 may provide services for the user equipment 2000. Therefore, all the embodiments of the electronic device 100 described above are applicable herein.

<3. Method Embodiments>

Hereinafter, a wireless communication method performed by an electronic device 100 serving as a network side device in a wireless communication system according to an embodiment of the present disclosure is described in detail.

Figure 21:
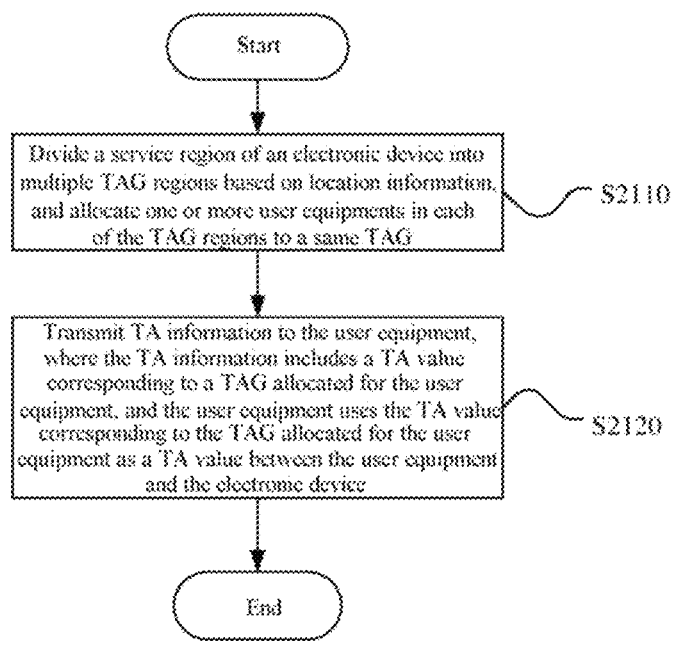
FIG. 21 is a flowchart of a wireless communication method performed by an electronic device according to an embodiment of the present disclosure.

FIG. 21 is a flowchart of a wireless communication method performed by an electronic device 100 serving as a network side device in a wireless communication system according to an embodiment of the present disclosure.

As shown in FIG. 21, in step S2110, a service region of an electronic device 100 is divided into multiple TAG regions based on the location information, and one or more user equipments in each of the TAG regions are allocated to a same TAG.

In step S2120, TA information is transmitted to the user equipment. The TA information includes a TA value corresponding to a TAG allocated for the user equipment, so that the user equipment uses the TA value corresponding to the TAG allocated for the user equipment as a TA value between the user equipment and the electronic device 100.

In an embodiment, the wireless communication method includes: allocating a TAG for the user equipment based on location information of the user equipment, and transmitting identification information of the TAG allocated for the user equipment to the user equipment.

In an embodiment, the TA information is transmitted by broadcasting the TA information, and the TA information includes identification information of TAGs in the service region of the electronic device 100 and TA values corresponding to the TAGs.

In an embodiment, the TA information is transmitted by multicasting the TA information, and the TA information includes identification information of the TAG allocated for the user equipment and a TA value corresponding to the TAG allocated for the user equipment.

In an embodiment, the wireless communication method includes: configuring different RNTIs for each of the TAGs in the service region of the electronic equipment; and scrambling the TA information using a RNTI corresponding to the TAG allocated for the user equipment.

In an embodiment, the wireless communication method further includes: grouping the multiple TAG regions in the service region of the electronic device 100 into multiple TAG clusters. The TA information is transmitted by multicasting the TA information. The TA information includes identification information of TAGs in a TAG cluster in which the TAG allocated for the user equipment is included and TA values corresponding to the TAGs.

In an embodiment, the wireless communication method further includes: configuring an unique RNTI for each of the TAG clusters; and scrambling the TA information using a RNTI corresponding to the TAG cluster in which the TAG allocated for the user equipment is included.

In an embodiment, the wireless communication method further includes: determining a TA value corresponding to the TAG according to a TA value between each user equipment in the TAG region and the electronic equipment 100.

In an embodiment, the wireless communication method further includes: dividing the service region of the electronic device 100 into multiple resource regions based on location information; configuring, for each of the resource regions, resources for transmitting preambles, where user equipments in a same resource region transmit preambles using same resources and user equipments in different resource regions transmit preambles using orthogonal resources; and transmitting service region information of the electronic device 100 to the user equipment, where the user equipment determines a resource region to which the user equipment belongs based on location information of the user equipment and the service region information of the electronic device 100, and determines resources for transmitting a preamble based on the resource region to which the user equipment belongs to transmit the preamble.

In an embodiment, the service region information is transmitted by broadcasting the service region information of the electronic device 100.

According to an embodiment of the present disclosure, the subject performing the method may be the electronic device 100 according to the embodiments of the present disclosure, so all the above embodiments of the electronic device 100 are applicable herein.

Hereinafter, a wireless communication method performed by a user equipment 2000 in a wireless communication system according to an embodiment of the present disclosure is described in detail.

Figure 22:
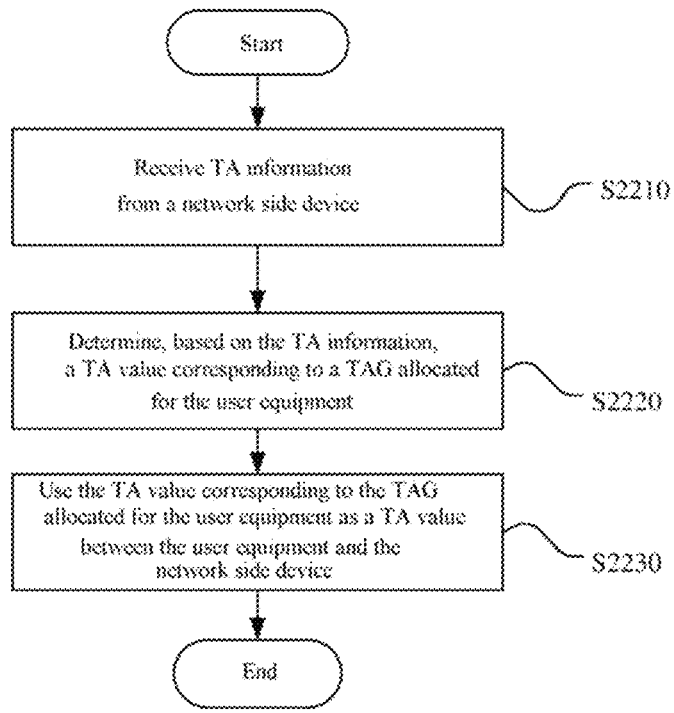
FIG. 22 is a flowchart of a wireless communication method performed by a user equipment according to an embodiment of the present disclosure.

FIG. 22 is a flowchart of a wireless communication method performed by a user equipment 2000 in a wireless communication system according to an embodiment of the present disclosure.

As shown in FIG. 22, in step S2210, TA information is received from a network side device.

In step S2220, a TA value corresponding to a TAG allocated for the user equipment 2000 is determined based on the TA information.

In step S2230, the TA value corresponding to the TAG allocated for the user equipment 2000 is used as a TA value between the user equipment 2000 and the network side device.

A service region of the network side device is divided into multiple TAG regions based on the location information, and one or more user equipments in each of the TAG regions are allocated to a same TAG.

In an embodiment, the wireless communication method further includes: transmitting location information of the user equipment 2000 to the network side device; and receiving, from the network side device, identification information of the TAG allocated for the user equipment 2000.

In an embodiment, the TA information includes: identification information of TAGs in the service region of the electronic device and TA values corresponding to the TAGs. The wireless communication method further includes: determining the TA value corresponding to the TAG allocated for the user equipment 2000 based on the TAG allocated for the user equipment 2000.

In an embodiment, the TA information includes: identification information of the TAG allocated for the user equipment 2000 and a TA value corresponding to the TAG allocated for the user equipment 2000. The wireless communication method further includes: descrambling the TA information using a RNTI corresponding to the TAG allocated for the user equipment 2000.

In an embodiment, the multiple TAG regions in the service region of the network side device are grouped into multiple TAG clusters. The TA information includes: identification information of TAGs in the TAG cluster in which the TAG allocated for the user equipment is included and TA values corresponding to the TAGs. The wireless communication method further includes: descrambling the TA information using a RNTI corresponding to a TAG cluster in which the TAG allocated for the user equipment 2000 is included.

In an embodiment, the wireless communication method further includes: transmitting updated location information of the user equipment 2000 to the network side device in a case that it is determined based on the location information of the user equipment 2000 that a TAG region in which the user equipment 2000 is located changes; and receiving, from the network side device, identification information of a TAG allocated for the user equipment 2000.

In an embodiment, the wireless communication method further includes: receiving service region information of the network side device from the network side device; determining a resource region to which the user equipment 2000 belongs based on location information of the user equipment 2000 and the service region information of the network side device; and determining resources for transmitting a preamble based on the resource region to which the user equipment 2000 belongs to transmit the preamble. The service region of the network side device is divided into multiple resource regions based on location information, one or more user equipments in a same resource region are configured with same resources for transmitting preambles, and user equipments in different resource regions are configured with orthogonal resources for transmitting preambles.

According to an embodiment of the present disclosure, the subject performing the method may be the user equipment 2000 according to the embodiments of the present disclosure, so all the embodiments of the user equipment 2000 are applicable herein.

<4. Application Examples>

The technology according to the present disclosure is applicable to various products.

For example, the network side device may be implemented by any types of TRP. The TRP may have transmitting and receiving functions, for example, the TRP may receive information from a user equipment and a base station equipment, and may transmit information to the user equipment and the base station equipment. In a typical example, the TRP may provide services to a user equipment and is controlled by a base station equipment. Further, the TRP may have a structure similar to the structure of the base station equipment described below, or may only have a structure related to the transmission and reception of information in the base station equipment.

The network side device may be implemented as various base stations, for example, a macro eNB and a small eNB, and may be implemented as any type of gNB. The small eNB may be an eNB, such as a pico eNB, a micro eNB, and a home (femto) eNB, which covers a cell smaller than a macro cell. Alternatively, the base station may be implemented as any other type of base station, such as a NodeB and a base transceiver station (BTS). The base station may include a body (which is also referred to as a base station device) configured to control wireless communications; and one or more remote radio heads (RRHs) arranged in a different position from the body.

The user equipment may be implemented as a mobile terminal (such as a smart phone, a tablet personal computer (PC), a notebook PC, a portable game terminal, a portable/dongle type mobile router, and a digital camera device), or an in-vehicle terminal (such as a car navigation device). The user equipment may also be implemented as a terminal (which is also referred to as a machine type communication (MTC) terminal) that performs machine-to-machine (M2M) communication. Furthermore, the user equipment may be a wireless communication module (such as an integrated circuit module including a single chip) mounted on each of the terminals.

[Application Examples of a Base Station]

(First Application Example)

Figure 23:
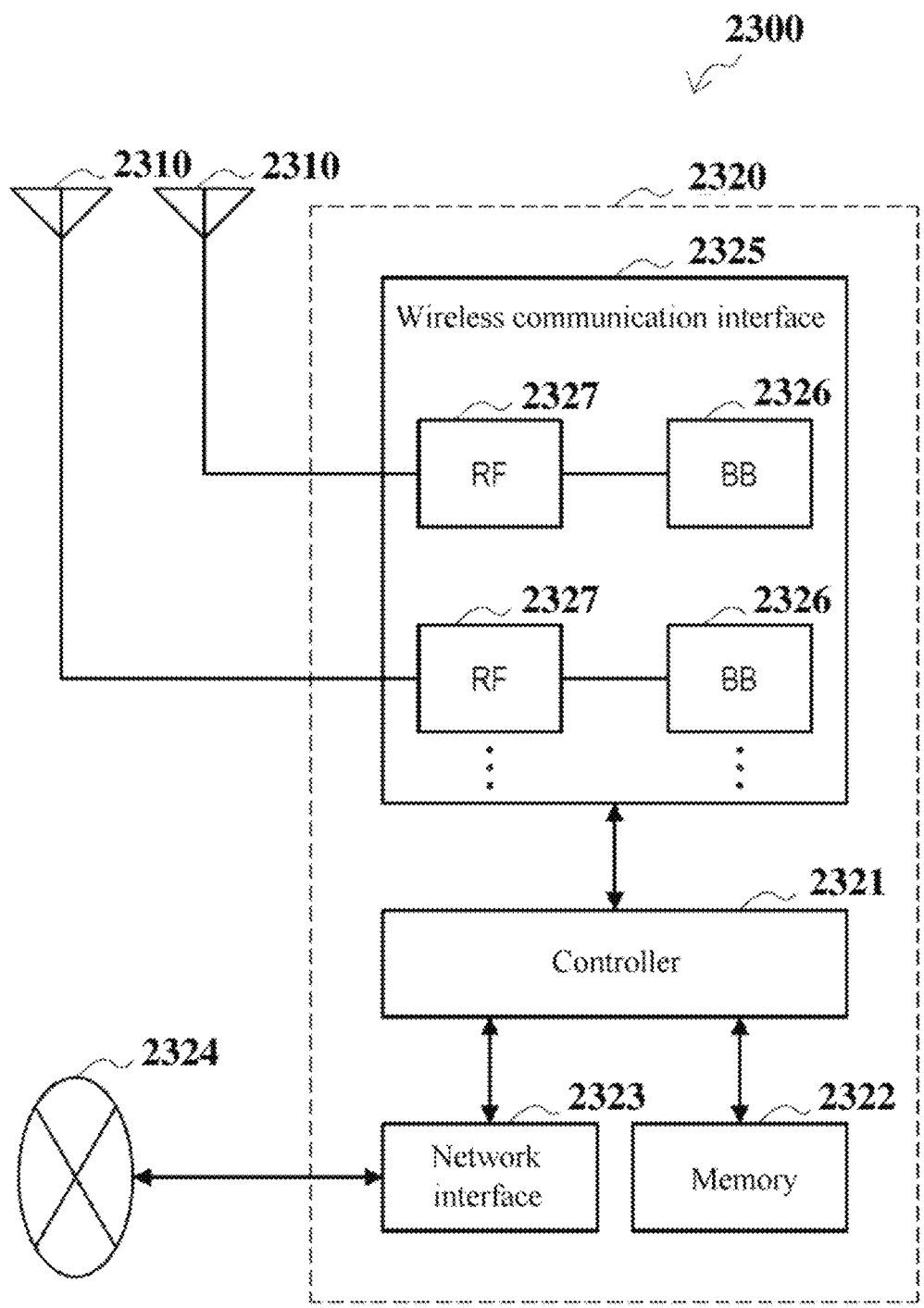
FIG. 23 is a block diagram showing a first example of a schematic configuration of an eNB (Evolved Node B)

FIG. 23 is a block diagram showing a first example of a schematic configuration of an eNB to which the technology of the present disclosure may be applied. An eNB 2300 includes one or more antennas 2310 and a base station device 2320. The base station device 2320 and each of the antennas 2310 may be connected to each other via a RF cable.

Each of the antennas 2310 includes a single or multiple antenna elements (such as multiple antenna elements included in a multiple-input multiple-output (MIMO) antenna), and is used for transmitting and receiving wireless signals by the base station device 2320. As shown in FIG. 23, the eNB 2300 may include multiple antennas 2310. For example, the multiple antennas 2310 may be compatible with multiple frequency bands used by the eNB 2300. Although FIG. 23 shows the example in which the eNB 2300 includes the multiple antennas 2310, the eNB 2300 may also include a single antenna 2310.

The base station device 2320 includes a controller 2321, a memory 2322, a network interface 2323, and a wireless communication interface 2325.

The controller 2321 may be, for example, a CPU or a DSP, and operate various functions of a higher layer of the base station device 2320. For example, the controller 2321 generates a data packet from data in signals processed by the wireless communication interface 2325, and transfers the generated packet via the network interface 2323. The controller 2321 may bundle data from multiple base band processors to generate a bundled packet, and transfer the generated bundled packet. The controller 2321 may have logical functions of performing control such as radio resource control, radio bearer control, mobility management, admission control, and scheduling. The control may be performed in corporation with an eNB or a core network node in the vicinity. The memory 2322 includes a RAM and a ROM, and stores a program which is executed by the controller 2321, and various types of control data (such as a terminal list, transmission power data, and scheduling data).

The network interface 2323 is a communication interface for connecting the base station device 2320 to a core network 2324. The controller 2321 may communicate with a core network node or another eNB via the network interface 2323. In this case, the eNB 2300 and the core network node or the other eNB may be connected to each other via a logical interface (such as an S1 interface and an X2 interface). The network interface 2323 may also be a wired communication interface or a wireless communication interface for radio backhaul. If the network interface 2323 is a wireless communication interface, the network interface 2323 may use a higher frequency band for wireless communication than a frequency band used by the wireless communication interface 2325.

The wireless communication interface 2325 supports any cellular communication scheme (such as Long Term Evolution (LTE) and LTE-Advanced), and provides wireless connection to a terminal positioned in a cell of the eNB 2300 via the antenna 2310. The wireless communication interface 2325 may typically include, for example, a baseband (BB) processor 2326 and an RF circuit 2327. The BB processor 2326 may perform, for example, encoding/decoding, modulating/demodulating, and multiplexing/demultiplexing, and performs various types of signal processing of layers (such as L1, medium access control (MAC), radio link control (RLC), and a packet data convergence protocol (PDCP)). The BB processor 2326 may have a part or all of the above-described logical functions instead of the controller 2321. The BB processor 2326 may be a memory which stores a communication control program, or a module that includes a processor and a related circuit configured to execute the program. Updating the programs may change functions of the BB processor 2326. The module may be a card or a blade which is inserted into a slot of the base station device 2320. Alternatively, the module may also be a chip that is mounted on the card or the blade. In addition, the RF circuit 2327 may include, for example, a frequency mixer, a filter, and an amplifier, and transmits and receives wireless signals via the antenna 2310.

As shown in FIG. 23, the wireless communication interface 2325 may include multiple BB processors 2326. For example, the multiple BB processors 2326 may be compatible with multiple frequency bands used by the eNB 2300. As shown in FIG. 23, the wireless communication interface 2325 may include multiple RF circuits 2327. For example, the multiple RF circuits 2327 may be compatible with multiple antenna elements. Although FIG. 23 shows the example in which the wireless communication interface 2325 includes the multiple BB processors 2326 and the multiple RF circuits 2327, the wireless communication interface 2325 may also include a single BB processor 2326 or a single RF circuit 2327.

(Second Application Example)

Figure 24:
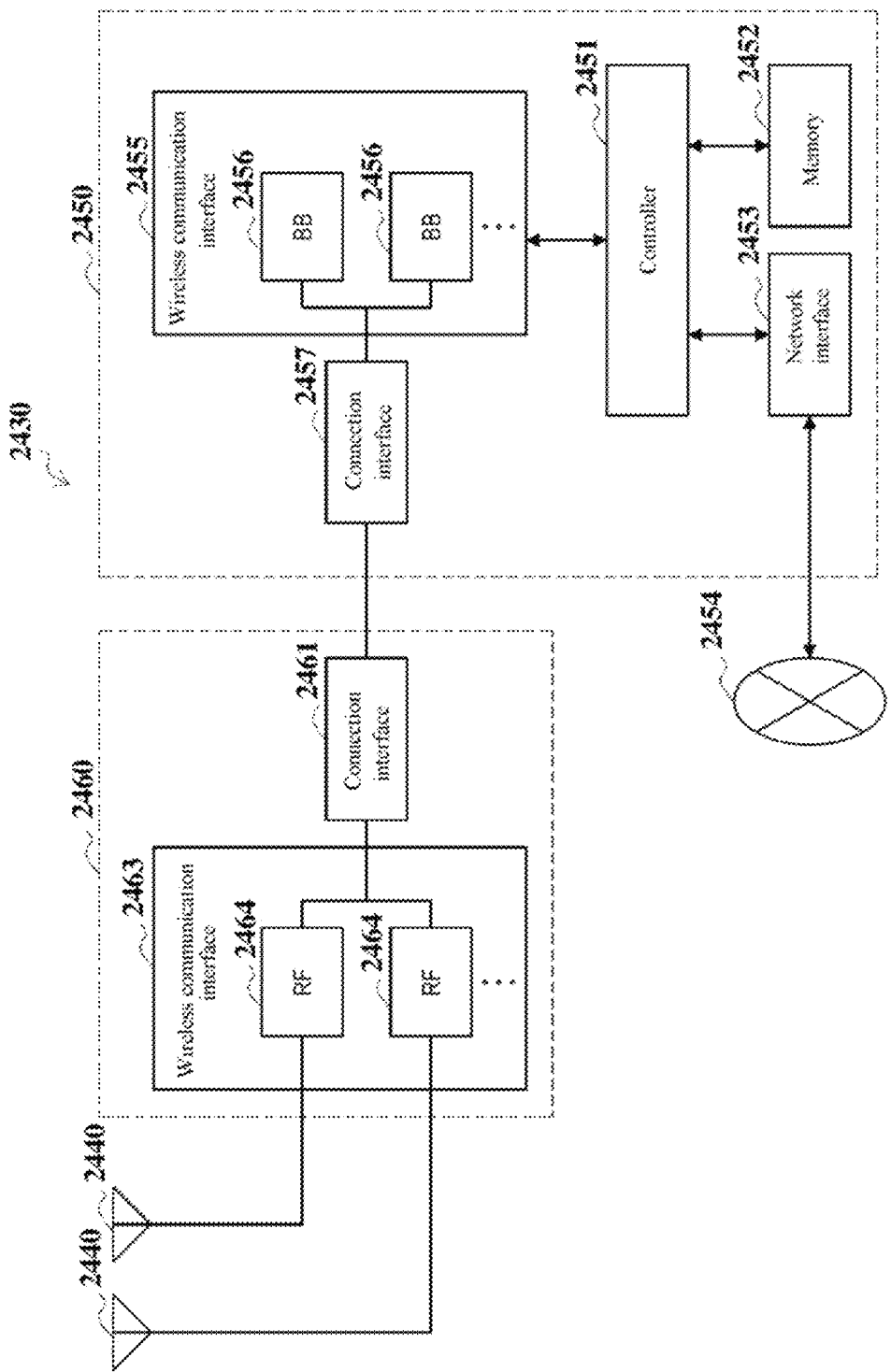
FIG. 24 is a block diagram showing a second example of a schematic configuration of an eNB.

FIG. 24 is a block diagram showing a second example of a schematic configuration of an eNB to which the technology according to the present disclosure may be applied. An eNB 2430 includes one or more antennas 2440, a base station device 2450, and an RRH 2460. Each of the antennas 2440 and the RRH 2460 may be connected to each other via an RF cable. The base station device 2450 and the RRH 2460 may be connected to each other via a high speed line such as an optical fiber cable.

Each of the antennas 2440 includes a single or multiple antenna elements (such as multiple antenna elements included in an MIMO antenna), and is used for the RRH 2460 to transmit and receive wireless signals. As shown in FIG. 24, the eNB 2430 may include multiple antennas 2440. For example, the multiple antennas 2440 may be compatible with multiple frequency bands used by the eNB 2430. Although FIG. 24 shows the example in which the eNB 2430 includes the multiple antennas 2440, the eNB 2430 may also include a single antenna 2440.

The base station device 2450 includes a controller 2451, a memory 2452, a network interface 2453, a wireless communication interface 2455, and a connection interface 2457. The controller 2451, the memory 2452, and the network interface 2453 are the same as the controller 2321, the memory 2322, and the network interface 2323 described with reference to FIG. 23.

The wireless communication interface 2455 supports any cellular communication scheme (such as LTE and LTE-Advanced), and provides wireless communication to a terminal positioned in a sector corresponding to the RRH 2460 via the RRH 2460 and the antenna 2440. The wireless communication interface 2455 may typically include, for example, a BB processor 2456. Other than connecting to an RF circuit 2464 of the RRH 2460 via the connection interface 2457, the BB processor 2456 is the same as the BB processor 2326 described with reference to FIG. 23. As shown in FIG. 24, the wireless communication interface 2455 may include multiple BB processors 2456. For example, the multiple BB processors 2456 may be compatible with multiple frequency bands used by the eNB 2430. Although FIG. 24 shows the example in which the wireless communication interface 2455 includes the multiple BB processors 2456, the wireless communication interface 2455 may also include a single BB processor 2456.

The connection interface 2457 is an interface for connecting the base station device 2450 (the wireless communication interface 2455) to the RRH 2460. The connection interface 2457 may be a communication module for a communication of the above high-speed line, which is used for connecting the base station device 2450 (the wireless communication interface 2455) the RRH 2460.

The RRH 2460 includes a connection interface 2461 and a wireless communication interface 2463.

The connection interface 2461 is an interface for connecting the RRH 2460 (the wireless communication interface 2463) to the base station device 2450. The connection interface 2461 may also be a communication module for the communication in the above high speed line.

The wireless communication interface 2463 transmits and receives wireless signals via the antenna 2440. The wireless communication interface 2463 may typically include, for example, the RF circuit 2464. The RF circuit 2464 may include, for example, a frequency mixer, a filter, and an amplifier, and transmits and receives wireless signals via the antenna 2440. As shown in FIG. 24, the wireless communication interface 2463 may include multiple RF circuits 2464. For example, the multiple RF circuits 2464 may support multiple antenna elements. Although FIG. 24 shows the example in which the wireless communication interface 2463 includes the multiple RF circuits 2464, the wireless communication interface 2463 may also include a single RF circuit 2464.

In the eNB 2300 shown in FIG. 23 and the eNB 2430 shown in FIG. 24, the division unit 110, the determination unit 120, the generation unit 130, the division unit 150, the configuration unit 160, and the generation unit 170 shown in FIG. 1 may be implemented by the controller 2321 and/or controller 2451. At least part of the functions may also be implemented by the controller 2321 and the controller 2451. For example, the controller 2321 and/or the controller 2451 may perform the functions of dividing TAGs and TAG regions, determining TA values of TAGs, generating TA information, dividing resource regions, configuring resources for transmitting preambles for each of the resource regions and generating service region information by executing corresponding instructions stored in the memory.

[Application Examples of a Terminal Equipment]

(First Application Example)

Figure 25:
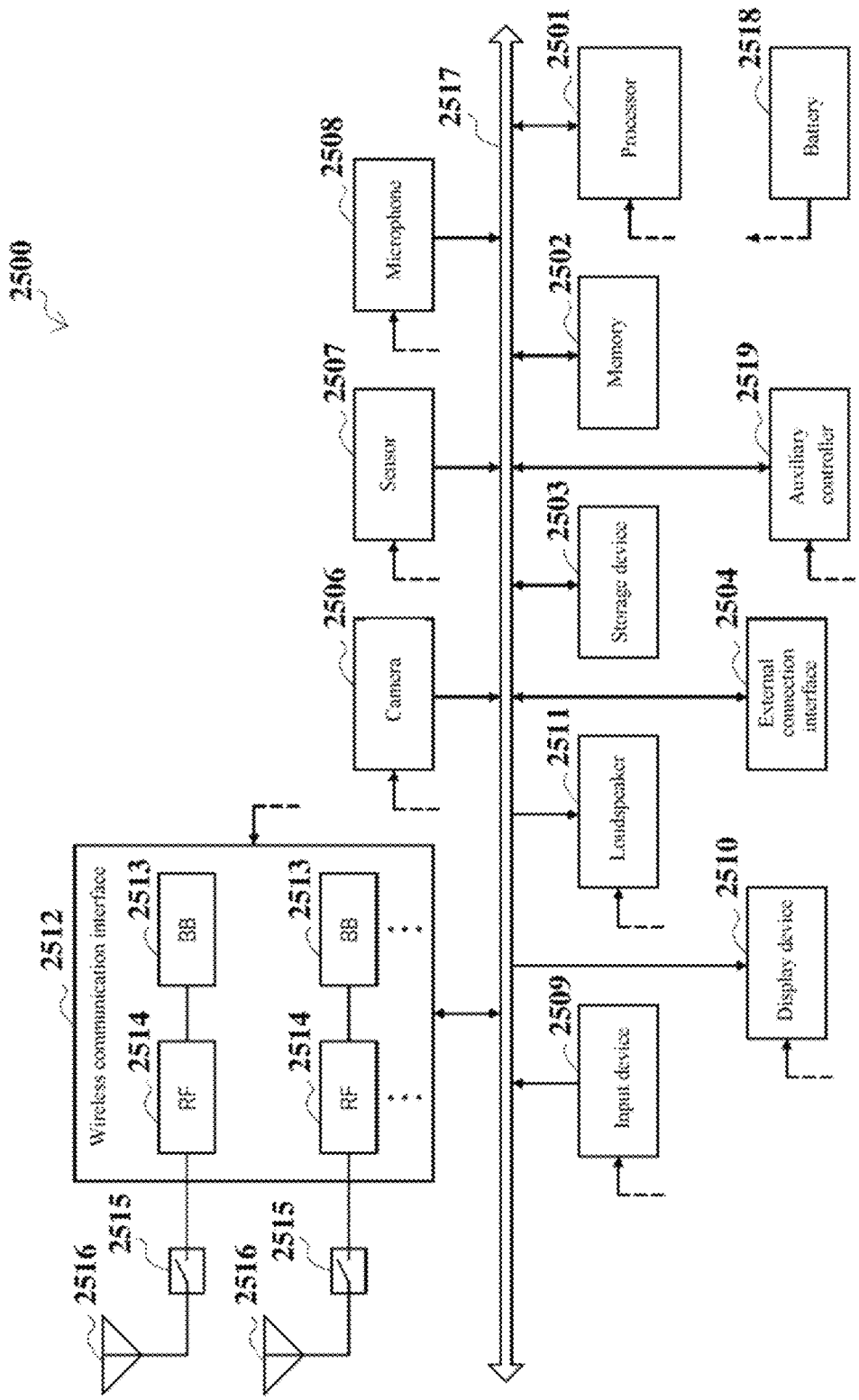
FIG. 25 is a block diagram showing an example of a schematic configuration of a smart phone.

FIG. 25 is a block diagram showing an example of a schematic configuration of a smartphone 2500 to which the technology according to the present disclosure may be applied. The smartphone 2500 includes a processor 2501, a memory 2502, a storage device 2503, an external connection interface 2504, a camera 2506, a sensor 2507, a microphone 2508, an input device 2509, a display device 2510, a speaker 2511, a wireless communication interface 2512, one or more antenna switches 2515, one or more antennas 2516, a bus 2517, a battery 2518, and an auxiliary controller 2519.

The processor 2501 may be, for example, a CPU or a system on a chip (SoC), and controls functions of an application layer and another layer of the smartphone 2500. The memory 2502 includes a RAM and a ROM, and stores programs executed by the processor 2501 and data. The storage device 2503 may include a storage medium, such as a semiconductor memory and a hard disk. The external connection interface 2504 is an interface for connecting an external device (such as a memory card and a universal serial bus (USB) device) to the smart phone 2500.

The camera 2506 includes an image sensor (such as a charge coupled device (CCD) and a complementary metal oxide semiconductor (CMOS)) and generates a captured image. The sensor 2507 may include a set of sensors, such as a measurement sensor, a gyroscope sensor, a geomagnetic sensor and an acceleration sensor. The microphone 2508 converts sound inputted into the smart phone 2500 into an audio signal. The input device 2509 includes, for example, a touch sensor configured to detect touch onto a screen of the display device 2510, a keypad, a keyboard, a button, or a switch, and receives an operation or information inputted from a user. The display device 2510 includes a screen (such as a liquid crystal display (LCD) and an organic light-emitting diode (OLED) display), and displays an output image of the smartphone 2500. The loudspeaker 2511 converts the audio signal outputted from the smart phone 2500 into sound.

The wireless communication interface 2512 supports any cellular communication scheme (such as LTE and LTE-advanced), and performs wireless communication. The wireless communication interface 2512 may generally include, for example, a BB processor 2513 and an RF circuit 2514. The BB processor 2513 may perform, for example, encoding/decoding, modulating/demodulating, and multiplexing/de-multiplexing, and perform various types of signal processing for wireless communication. In addition, the RF circuit 2514 may include, for example, a frequency mixer, a filter, and an amplifier, and transmits and receives wireless signals via an antenna 2516. It should be noted that although FIG. 25 shows a case that one RF link is connected to one antenna, which is only illustrative, and a case that one RF link is connected to multiple antennas via multiple phase shifters may also be included. The wireless communication interface 2512 may be a one chip module having the BB processor 2513 and the RF circuit 914 integrated thereon. As illustrated in FIG. 25, the wireless communication interface 2512 may include the multiple BB processors 2513 and the multiple RF circuits 2514. Although FIG. 25 shows the example in which the wireless communication interface 2512 includes the multiple BB processors 2513 and the multiple RF circuits 2514, the wireless communication interface 2512 may also include a single BB processor 2513 or a single RF circuit 2514.

Furthermore, in addition to a cellular communication scheme, the wireless communication interface 2512 may support another type of wireless communication scheme, such as a short-distance wireless communication scheme, a near field communication scheme, and a wireless local area network (LAN) scheme. In this case, the wireless communication interface 2512 may include the BB processor 2513 and the RF circuit 2514 for each of the wireless communication schemes.

Each of the antenna switches 2515 switches connection destinations of the antennas 2516 among multiple circuits (such as circuits for different wireless communication schemes) included in the wireless communication interface 2512.

Each of the antennas 2516 includes a single or multiple antenna elements (such as multiple antenna elements included in an MIMO antenna), and is used for the wireless communication interface 2512 to transmit and receive wireless signals. As shown in FIG. 25, the smartphone 2500 may include the multiple antennas 2516. Although FIG. 25 shows the example in which the smartphone 2500 includes the multiple antennas 2516, the smartphone 2500 may also include a single antenna 2516.

Furthermore, the smartphone 2500 may include the antenna 2516 for each wireless communication scheme. In this case, the antenna switch 2515 may be omitted from the configuration of the smart phone 2500.

The bus 2517 connects the processor 2501, the memory 2502, the storage device 2503, the external connection interface 2504, the camera 2506, the sensor 2507, the microphone 2508, the input device 2509, the display device 2510, the loudspeaker 2511, the wireless communication interface 2512 and the auxiliary controller 2519 with each other. The battery 2518 supplies power for blocks in the smart phone 2500 shown in FIG. 25 via a feeder which is indicated partially as a dashed line in FIG. 25. The auxiliary controller 2519, for example, controls a minimum necessary function for operating the smart phone 2500 in a sleeping mode.

In the smart phone 2500 shown in FIG. 25, the processing unit 2020, the determination unit 2030, the positioning unit 2040, the update initiation unit 2050, the storage unit 2060, and the searching unit 2070 shown in FIG. 20 may be implemented by the processor 2501 or the auxiliary controller 2519. At least a part of the functions may be implemented by the processor 2501 or the auxiliary controller 2519. For example, the processor 2501 or the auxiliary controller 2519 may perform the functions of decoding TA information, determining a TA value with the network side device, determining a location, determining whether it is required to update a location, storing a mapping relationship between resource regions and the resources, searching the mapping relationship to determine resources for transmitting preambles by executing instructions stored in the memory 2502 or the storage device 2503.

(Second Application Example)

Figure 26:
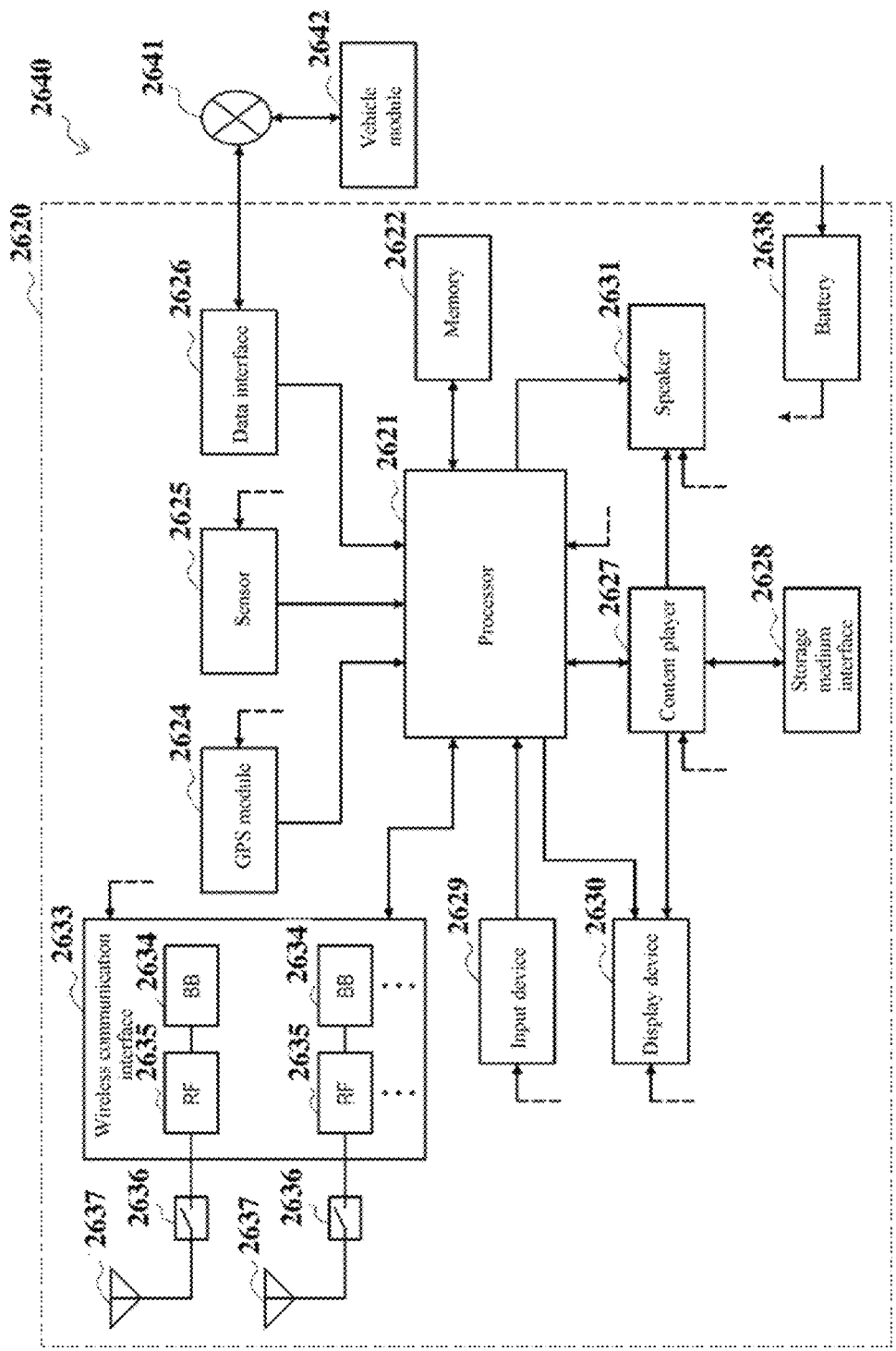
FIG. 26 is a block diagram showing an example of a schematic configuration of a car navigation device.

FIG. 26 is a block diagram showing an example of a schematic configuration of a car navigation device 2620 to which the technology according to the present disclosure may be applied. The car navigation device 2620 includes a processor 2621, a memory 2622, a global positioning system (GPS) module 2624, a sensor 2625, a data interface 2626, a content player 2627, a storage medium interface 2628, an input device 2629, a display device 2630, a speaker 2631, a wireless communication interface 2633, one or more antenna switches 2636, one or more antennas 2637, and a battery 2638.

The processor 2621 may be, for example, a CPU or a SoC, and controls the navigation function and additional functions of the car navigation device 2620. The memory 2622 includes a RAM and a ROM, and stores programs executed by the processor 2621 and data.

The GPS module 2624 measures a position (such as a latitude, a longitude, and a height) of the car navigation device 2620 based on a GPS signal received from a GPS satellite. The sensor 2625 may include a group of sensors, such as, a gyroscope sensor, a geomagnetic sensor, and an air pressure sensor. The data interface 2626 is connected to, for example, an in-vehicle network 2641 via a terminal which is not shown, and acquires data generated by the vehicle (such as vehicle speed data).

The content player 2627 reproduces contents stored in a storage medium (such as a CD and a DVD), where the storage medium is inserted into the storage medium interface 2628. The input device 2629 includes, for example, a touch sensor configured to detect touch on a screen of the display device 2630, a button, or a switch, and receives an operation or information inputted from a user. The display device 2630 includes a screen, for example, an LCD display or an OLED display, and displays an image with a navigation function or the reproduced content. The loudspeaker 2631 outputs a sound with a navigation function or the reproduced content.

The wireless communication interface 2633 supports any cellular communication scheme (such as, LTE and LTE-Advanced), and performs wireless communication. The wireless communication interface 2633 may usually include, for example, a BB processor 2634 and an RF circuit 2635. The BB processor 2634 may perform, for example, encoding/decoding, modulating/demodulating, and multiplexing/de-multiplexing, and performs various types of signal processing for wireless communication. In addition, the RF circuit 2635 may include, for example, a frequency mixer, a filter, and an amplifier, and transmit and receive wireless signals via the antenna 2637. The wireless communication interface 2633 may also be a chip module on which the BB processor 2634 and the RF circuit 2635 are integrated. As shown in FIG. 26, the wireless communication interface 2633 may include multiple BB processors 2634 and multiple RF circuits 2635. Although FIG. 26 shows an example in which the wireless communication interface 2633 includes multiple BB processors 2634 and multiple RF circuits 2635, the wireless communication interface 2633 may include a single BB processor 2634 or a single RF circuit 2635.

Furthermore, in addition to a cellular communication scheme, the wireless communication interface 2633 may support another type of wireless communication scheme, such as a short-distance wireless communication scheme, a near field communication scheme, and a wireless LAN scheme. In this case, for each of the wireless communication schemes, the wireless communication interface 2633 may include a BB processor 2634 and an RF circuit 2635.

Each of the antenna switches 2636 switches connection destinations of the antennas 2637 among multiple circuits (such as circuits for different wireless communication schemes) included in the wireless communication interface 2633.

Each of the antennas 2637 includes one or more antenna elements (such as multiple antenna elements included in a MIMO antenna) and is used by the wireless communication interface 2633 to transmit and receive wireless signals. As shown in FIG. 26, the car navigation device 2620 may include multiple antennas 2637. Although FIG. 26 shows the example in which the car navigation device 2620 includes the multiple antennas 2637, the car navigation device 2620 may also include a single antenna 2637.

Furthermore, the car navigation device 2620 may include an antenna 2637 for each of the wireless communication schemes. In this case, the antenna switch 2636 may be omitted from the configuration of the car navigation device 2620.

The battery 2638 supplies power to each of the blocks of the car navigation device 2620 shown in FIG. 26 via feeders which are partially shown with dashed lines in FIG. 26. The battery 2638 accumulates power supplied from the vehicle.

In the car navigation device 2620 shown in FIG. 26, the processing unit 2020, the determination unit 2030, the positioning unit 2040, the update initiation unit 2050, the storage unit 2060, and the searching unit 2070 shown in FIG. 20 may be implemented by the processor 2621. At least a part of the functions may be implemented by the processor 2621. For example, the processor 2621 may perform the functions of decoding TA information, determining a TA value with the network side device, determining a location, determining whether it is required to update a location, storing a mapping relationship between resource regions and the resources, searching the mapping relationship to determine resources for transmitting preambles by executing instructions stored in the memory 2622.

The technology according to the present disclosure may also be implemented as an in-vehicle system (or a vehicle) 2640 including one or more blocks of the car navigation device 2620, the in-vehicle network 2641 and a vehicle module 2642. The vehicle module 2642 generates vehicle data (such as vehicle speed, engine speed, and fault information), and outputs the generated data to the in-vehicle network 2641.

The preferred embodiments of the present disclosure have been described above with reference to the accompanying drawings. Apparently, the present disclosure is not limited to the above embodiments. Those skilled in the art may obtain various changes and modifications within the scope of the appended claims, and it should be understood that these changes and modifications are fall within the technical scope of the present disclosure.

For example, the units shown in dashed boxes in the functional block diagrams shown in the drawings indicate that the functional units are optional in the corresponding device, and the various optional functional units may be combined in an appropriate manner to perform required functions.

For example, the functions included in one unit according to the above embodiments may be realized by separate devices. Alternatively, the functions implemented by multiple units in the above embodiments may be implemented by separate devices, respectively. In addition, one of the above functions may be implemented by multiple units. It should be understood that the above configurations are included in the technical scope of the present disclosure.

In this specification, the steps described in the flowchart may be performed in the chronological order described herein, and may be performed in parallel or independently rather than necessarily in the chronological order. In addition, the chronological order in which the steps are performed may be changed appropriately.

Although the embodiments of the present disclosure have been described above in detail in connection with the drawings, it should be appreciated that the embodiments described above are merely illustrative rather than limitative of the present disclosure. Those skilled in the art can make various modifications and variations to the above embodiments without departing from the spirit and scope of the present disclosure. Therefore, the scope of the present disclosure is defined merely by the appended claims and their equivalents.

The invention claimed is:

1. An electronic device on a network side, comprising processing circuitry configured to:
    divide a service region of the electronic device into a plurality of timing advance group TAG regions based on location information, and allocate one or more user equipments in each of the TAG regions to a same TAG; and
    transmit timing advance TA information to the user equipment, wherein the TA information comprises a TA value corresponding to a TAG allocated for the user equipment, and the user equipment uses the TA value corresponding to the TAG allocated for the user equipment as a TA value between the user equipment and the electronic device.

2. The electronic device according to claim 1, wherein the processing circuitry is further configured to:
    allocate a TAG for the user equipment based on location information of the user equipment; and
    transmit identification information of the TAG allocated for the user equipment to the user equipment.

3. The electronic device according to claim 1, wherein the TA information comprises: identification information of TAGs in the service region of the electronic device and TA values corresponding to the TAGs.

4. The electronic device according to claim 1, wherein the TA information comprises: identification information of the TAG allocated for the user equipment and a TA value corresponding to the TAG allocated for the user equipment.

5. The electronic device according to claim 4, wherein the processing circuitry is further configured to:
    configure different radio network temporary identifiers RNTIs for each of the TAGs in the service region of the electronic equipment; and
    scramble the TA information using a RNTI corresponding to the TAG allocated for the user equipment.

6. The electronic device according to claim 1, wherein the processing circuitry is further configured to:
    group the plurality of TAG regions in the service region of the electronic device into a plurality of TAG clusters, and
    wherein the TA information comprises identification information of TAGs in a TAG cluster in which the TAG allocated for the user equipment is comprised and TA values corresponding to the TAGs.

7. The electronic device according to claim 6, wherein the processing circuitry is further configured to:
configure an unique radio network temporary identifier RNTI for each of the TAG clusters; and
scramble the TA information using a RNTI corresponding to the TAG cluster in which the TAG allocated for the user equipment is comprised.

8. The electronic device according to claim 1, wherein the processing circuitry is further configured to:
determine a TA value corresponding to the TAG according to a TA value between each of the user equipment in the TAG region and the electronic equipment.

9. The electronic device according to claim 1, wherein the processing circuitry is further configured to:
divide the service region of the electronic device into a plurality of resource regions based on location information;
configure, for each of the resource regions, resources for transmitting preambles, wherein user equipments in a same resource region transmit preambles using same resources, and user equipments in different resource regions transmit preambles using orthogonal resources; and
transmit service region information of the electronic device to the user equipment, wherein the user equipment determines a resource region to which the user equipment belongs based on location information of the user equipment and the service region information of the electronic device, and determines resources for transmitting a preamble based on the resource region to which the user equipment belongs to transmit the preamble.

10. A user equipment, comprising processing circuitry configured to:
receive timing advance TA information from a network side device;
determine, based on the TA information, a TA value corresponding to a timing advance group TAG allocated for the user equipment; and
use the TA value corresponding to the TAG allocated for the user equipment as a TA value between the user equipment and the network side device;
wherein a service region of the network side device is divided into a plurality of TAG regions based on location information, and one or more user equipments in each of the TAG regions is allocated to a same TAG.

11. The user equipment according to claim 10, wherein the processing circuitry is further configured to:
transmit location information of the user equipment to the network side device; and
receive, from the network side device, identification information of the TAG allocated for the user equipment.

12. The user equipment according to claim 11, wherein the processing circuitry is further configured to:
transmit updated location information of the user equipment to the network side device in a case that it is determined based on the location information of the user equipment that a TAG region in which the user equipment is located changes; and
receive, from the network side device, identification information of an updated TAG allocated for the user equipment.

13. The user equipment according to claim 10, wherein the processing circuitry is further configured to: determine the TA value corresponding to the TAG allocated for the user equipment based on the TAG allocated for the user equipment, and
wherein the TA information comprises: identification information of TAGs in the service region of the network side device and TA values corresponding to the TAGs.

14. The user equipment according to claim 10, wherein the processing circuitry is further configured to: descramble the TA information using a wireless network temporary identifier RNTI corresponding to the TAG allocated for the user equipment, and
wherein the TA information comprises: identification information of the TAG allocated for the user equipment and a TA value corresponding to the TAG allocated for the user equipment.

15. The user equipment according to claim 10, wherein the plurality of TAG regions in the service region of the network side device are grouped into a plurality of TAG clusters,
the processing circuitry is further configured to: descramble the TA information using a wireless network temporary identifier RNTI corresponding to a TAG cluster in which the TAG allocated for the user equipment is comprised, and
wherein the TA information comprises identification information of TAGs in the TAG cluster in which the TAG allocated for the user equipment is comprised and TA values corresponding to the TAGs.

16. The user equipment according to claim 10, wherein the processing circuitry is further configured to:
receive service region information of the network side device from the network side device;
determine a resource region to which the user equipment belongs based on location information of the user equipment and the service region information of the network side device; and
determine resources for transmitting a preamble based on the resource region to which the user equipment belongs to transmit the preamble;
wherein the service region of the network side device is divided into a plurality of resource regions based on location information, one or more user equipments in a same resource region are configured with same resources for transmitting preambles, and user equipments in different resource regions are configured with orthogonal resources for transmitting preambles.

17. A wireless communication method performed by an electronic device on a network side, comprising:
dividing a service region of the electronic device into a plurality of timing advance group TAG regions based on location information, and allocating one or more user equipments in each of the TAG regions to a same TAG; and
transmitting timing advance TA information to the user equipment, wherein the TA information comprises a TA value corresponding to a TAG allocated for the user equipment, and the user equipment uses the TA value corresponding to the TAG allocated for the user equipment as a TA value between the user equipment and the electronic device.

18. The wireless communication method according to claim 17, further comprising:
allocating a TAG for the user equipment based on location information of the user equipment; and
transmitting identification information of the TAG allocated for the user equipment to the user equipment.

19. The wireless communication method according to claim 17, wherein the TA information comprises: identification information of TAGs in the service region of the electronic device and TA values corresponding to the TAGs.

20. The wireless communication method according to claim 17, wherein the TA information comprises: identification information of the TAG allocated for the user equipment and a TA value corresponding to the TAG allocated for the user equipment.

\* \* \* \* \*